United States Patent
Sun et al.

(10) Patent No.: US 12,402,170 B2
(45) Date of Patent: Aug. 26, 2025

(54) RECEIVER-SIDE ASSISTANCE INFORMATION USING MULTIPLE UPLINK TRANSMIT OPPORTUNITIES

(71) Applicant: QUALCOMM Incorporated, San Diego, CA (US)

(72) Inventors: Jing Sun, San Diego, CA (US); Vinay Chande, San Diego, CA (US); Arumugam Chendamarai Kannan, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 846 days.

(21) Appl. No.: 17/573,477

(22) Filed: Jan. 11, 2022

(65) Prior Publication Data

US 2022/0232633 A1 Jul. 21, 2022

Related U.S. Application Data

(60) Provisional application No. 63/138,379, filed on Jan. 15, 2021.

(51) Int. Cl.
*H04W 74/0816* (2024.01)
*H04L 1/1812* (2023.01)
(Continued)

(52) U.S. Cl.
CPC ....... *H04W 74/0816* (2013.01); *H04L 1/1812* (2013.01); *H04L 5/0053* (2013.01); *H04W 24/10* (2013.01); *H04W 74/006* (2013.01)

(58) Field of Classification Search
CPC ............. H04W 74/0816; H04W 24/10; H04W 74/006; H04L 1/1812; H04L 5/0053
See application file for complete search history.

(56) References Cited

U.S. PATENT DOCUMENTS

2020/0092913 A1 3/2020 Xu et al.
2020/0314889 A1* 10/2020 Cirik .................... H04W 72/23
(Continued)

FOREIGN PATENT DOCUMENTS

WO WO-2020162804 A1 8/2020
WO WO-2020190190 A1 9/2020
WO WO-2020193515 A1 10/2020

OTHER PUBLICATIONS

International Search Report and Written Opinion—PCT/US2022/070151—ISA/EPO—May 6, 2022.

*Primary Examiner* — Basil Ma
(74) *Attorney, Agent, or Firm* — Holland & Hart LLP/Qualcomm

(57) ABSTRACT

This disclosure provides systems, methods, and apparatuses for sharing a user equipment (UE)-initiated channel occupancy time (COT) with a base station (BS) by transmitting receiver-side assistance information on an uplink shared channel of an unlicensed radio frequency spectrum band. In some aspects, the UE may perform a clear channel assessment (CCA) prior to an uplink transmit opportunity, and if the CCA is successful, transmit the receiver-side assistance information on the uplink shared channel to share the COT with a BS. Multiple uplink transmit opportunities may be indicated to the UE send the receiver-side assistance information. In some examples, the uplink transmit opportunities may be configured grant occasions for a configured grant or scheduled by downlink control information. By transmitting to the BS, the UE may share the COT with the BS, and the BS may send downlink data to the UE during the COT.

40 Claims, 9 Drawing Sheets

(51) Int. Cl.
*H04L 5/00* (2006.01)
*H04W 24/10* (2009.01)
*H04W 74/00* (2009.01)

(56) References Cited

U.S. PATENT DOCUMENTS

2020/0383132 A1  12/2020  Yang et al.
2021/0092769 A1   3/2021  Koorapaty et al.
2021/0105815 A1*  4/2021  Salem ............... H04W 74/0808

* cited by examiner

RECEIVER-SIDE ASSISTANCE INFORMATION USING MULTIPLE UPLINK TRANSMIT OPPORTUNITIES

CROSS REFERENCE TO RELATED APPLICATIONS

The present Application for Patent claims the benefit of U.S. Provisional Patent Application No. 63/138,379 by SUN et al., entitled "RECEIVER-SIDE ASSISTANCE INFORMATION USING MULTIPLE UPLINK TRANSMIT OPPORTUNITIES," filed Jan. 15, 2021, assigned to the assignee hereof, and expressly incorporated by reference herein.

TECHNICAL FIELD

The following relates to wireless communications, including receiver-side assistance information using multiple uplink transmit opportunities.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread OFDM (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving an indication of a set of multiple uplink transmit opportunities, initiating a channel occupancy time (COT) based on a successful clear channel assessment (CCA) performed prior to a first uplink transmit opportunity of the set of multiple uplink transmit opportunities, transmitting receiver-side assistance information during the first uplink transmit opportunity on an uplink shared channel in shared spectrum, the receiver-side assistance information indicating that the COT is initiated, and monitoring for a downlink shared channel transmission in the shared spectrum during the COT based on the receiver-side assistance information.

Another innovative aspect of the subject matter described in this disclosure can be implemented in an apparatus for wireless communications at a UE. The apparatus may include a first interface, a second interface, and a processing system. The first interface may be configured to obtain an indication of a set of multiple uplink transmit opportunities. The processing system may be configured to initiate a COT based on a successful CCA performed prior to a first uplink transmit opportunity of the set of multiple uplink transmit opportunities. The first interface or the second interface may be configured to output receiver-side assistance information during the first uplink transmit opportunity on an uplink shared channel in shared spectrum, the receiver-side assistance information indicating that the COT is initiated. The processing system may be configured to monitor for a downlink shared channel transmission in the shared spectrum during the COT based on the receiver-side assistance information.

Another innovative aspect of the subject matter described in this disclosure can be implemented in another apparatus for wireless communications at a UE. The apparatus may include a processor, memory coupled with the processor, and instructions stored in the memory. The instructions may be executable by the processor to cause the apparatus to receive an indication of a set of multiple uplink transmit opportunities, initiate a COT based on a successful CCA performed prior to a first uplink transmit opportunity of the set of multiple uplink transmit opportunities, output receiver-side assistance information during the first uplink transmit opportunity on an uplink shared channel in shared spectrum, the receiver-side assistance information indicating that the COT is initiated, and monitor for a downlink shared channel transmission in the shared spectrum during the COT based on the receiver-side assistance information.

Another innovative aspect of the subject matter described in this disclosure can be implemented in another apparatus for wireless communications at a UE. The apparatus may include means for receiving an indication of a set of multiple uplink transmit opportunities, means for initiating a COT based on a successful CCA performed prior to a first uplink transmit opportunity of the set of multiple uplink transmit opportunities, means for transmitting receiver-side assistance information during the first uplink transmit opportunity on an uplink shared channel in shared spectrum, the receiver-side assistance information indicating that the COT is initiated, and means for monitoring for a downlink shared channel transmission in the shared spectrum during the COT based on the receiver-side assistance information.

Another innovative aspect of the subject matter described in this disclosure can be implemented in a non-transitory computer-readable medium storing code for wireless communications at a UE. The code may include instructions executable by a processor to receive an indication of a set of multiple uplink transmit opportunities, initiate a COT based on a successful CCA performed prior to a first uplink transmit opportunity of the set of multiple uplink transmit opportunities, transmit receiver-side assistance information during the first uplink transmit opportunity on an uplink shared channel in shared spectrum, the receiver-side assistance information indicating that the COT is initiated, and monitor for a downlink shared channel transmission in the shared spectrum during the COT based on the receiver-side assistance information.

One innovative aspect of the subject matter described in this disclosure can be implemented in a method for wireless communications at a base station (BS). The method may include transmitting an indication of a set of multiple uplink transmit opportunities, receiving, from a UE, receiver-side assistance information on an uplink shared channel in shared spectrum during a first uplink transmit opportunity of the set of multiple uplink transmit opportunities, the receiver-side assistance information indicating that a COT is initiated, and transmitting a downlink shared channel transmission in the shared spectrum during the COT based on the receiver-side assistance information.

Another innovative aspect of the subject matter described in this disclosure can be implemented in an apparatus for wireless communications at a BS. The apparatus may include a first interface, a second interface, and a processing system. The first interface may be configured to output an indication of a set of multiple uplink transmit opportunities. The first interface or the second interface may be configured to obtain, from a UE, receiver-side assistance information on an uplink shared channel in shared spectrum during a first uplink transmit opportunity of the set of multiple uplink transmit opportunities, the receiver-side assistance information indicating that a COT is initiated. The first interface or the second interface may be configured to output a downlink shared channel transmission in the shared spectrum during the COT based on the receiver-side assistance information.

Another innovative aspect of the subject matter described in this disclosure can be implemented in another apparatus for wireless communications at a BS. The apparatus may include a processor, memory coupled with the processor, and instructions stored in the memory. The instructions may be executable by the processor to cause the apparatus to transmit an indication of a set of multiple uplink transmit opportunities, receive, from a UE, receiver-side assistance information on an uplink shared channel in shared spectrum during a first uplink transmit opportunity of the set of multiple uplink transmit opportunities, the receiver-side assistance information indicating that a COT is initiated, and transmit a downlink shared channel transmission in the shared spectrum during the COT based on the receiver-side assistance information.

Another innovative aspect of the subject matter described in this disclosure can be implemented in another apparatus for wireless communications at a UE. The apparatus may include means for transmitting an indication of a set of multiple uplink transmit opportunities, means for receiving, from a UE, receiver-side assistance information on an uplink shared channel in shared spectrum during a first uplink transmit opportunity of the set of multiple uplink transmit opportunities, the receiver-side assistance information indicating that a COT is initiated, and means for transmitting a downlink shared channel transmission in the shared spectrum during the COT based on the receiver-side assistance information.

Another innovative aspect of the subject matter described in this disclosure can be implemented in a non-transitory computer-readable medium storing code for wireless communications at a UE. The code may include instructions executable by a processor to transmit an indication of a set of multiple uplink transmit opportunities, receive, from a UE, receiver-side assistance information on an uplink shared channel in shared spectrum during a first uplink transmit opportunity of the set of multiple uplink transmit opportunities, the receiver-side assistance information indicating that a COT is initiated, and transmit a downlink shared channel transmission in the shared spectrum during the COT based on the receiver-side assistance information.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
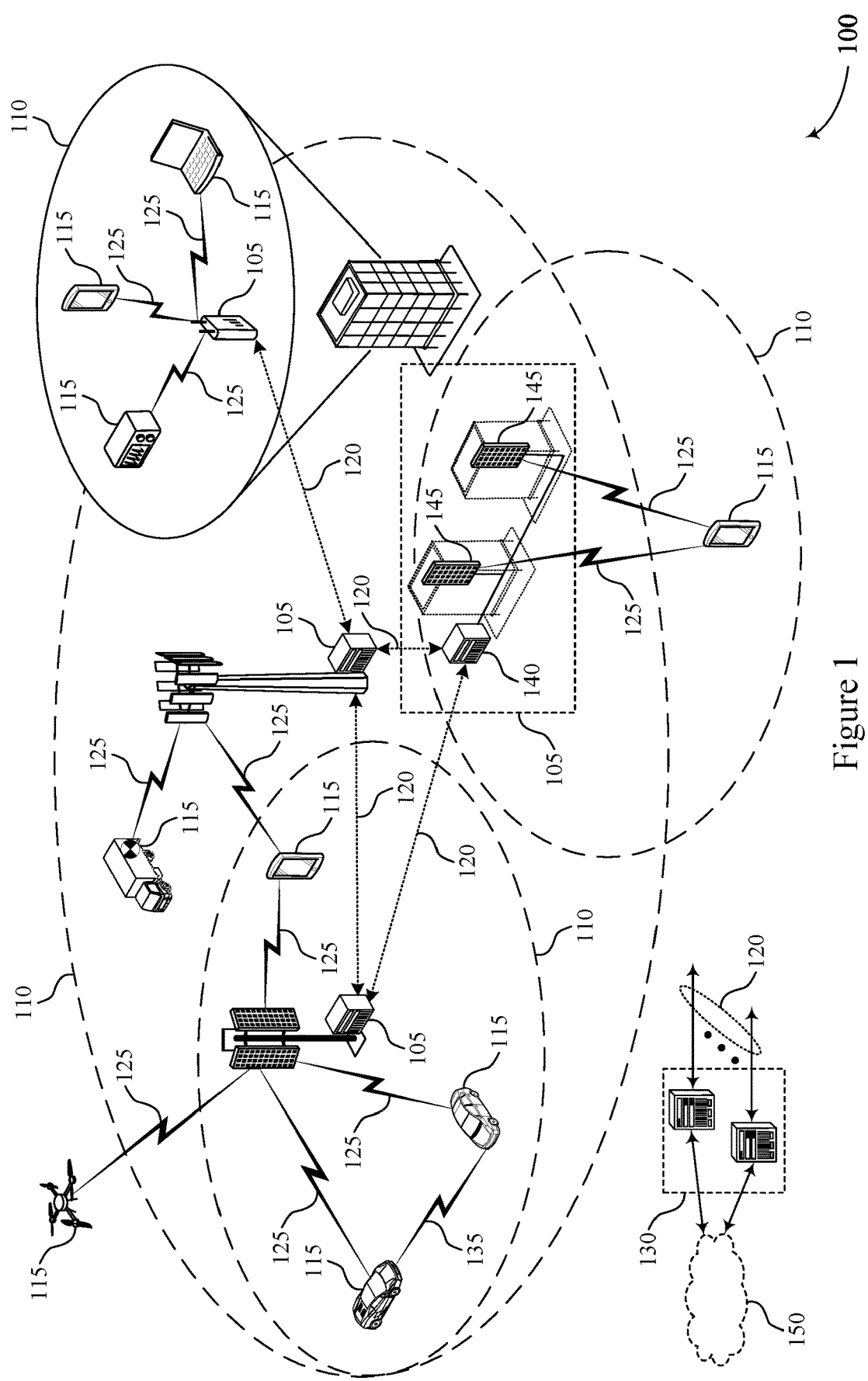
FIG. 1 illustrates an example of a wireless communications system that supports receiver-side assistance information using multiple uplink transmit opportunities.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A user equipment (UE) and a base station (BS) may communicate using millimeter wave (mmW) signaling on an unlicensed radio frequency spectrum band. Communications on an unlicensed radio frequency spectrum band may use channel sensing procedures, such as a clear channel assessment (CCA), to obtain access to a channel medium. A device which successfully performs a CCA may obtain the channel medium for a channel occupancy time (COT) and may transmit on the channel medium without interference from other devices. In some examples, the BS may have data ready to transmit to the UE. The UE and BS may attempt to protect reception of the different data from interference, but the BS and the UE may observe different interference patterns given the highly direction nature of mmW transmission.

To determine that the receiver-side channel can support reception without disruptive interference, the BS may first transmit a pre-grant. The UE may receive the pre-grant, and the UE may perform a CCA to gain access to the wireless channel and transmit an acknowledgment in response to the pre-grant. The acknowledgment may indicate that the receiver-side channel is clear for reception, and the BS may transmit the data to the UE. If the acknowledgment is not received (for example, the UE does not pass the CCA), the BS may determine that the UE is being affected by interference, and the BS may refrain from communicating using that beam direction to avoid the interference. The UE may have multiple time domain opportunities to transmit the acknowledgment to the pre-grant. The UE may perform a CCA before each of the opportunities to gain access to the wireless channel and transmit the acknowledgment. The UE successfully performing the CCA may initiate a COT, and the UE may share the COT with the BS by transmitting the acknowledgment to the BS. The BS may transmit the data to the UE during a downlink portion of the shared COT.

Wireless communications systems described herein support techniques to send receiver-side assistance information with an uplink shared channel transmission to indicate that a UE has initiated a COT. Multiple uplink transmit opportunities for an uplink shared channel may be indicated to the UE to send the receiver-side assistance information. For example, the UE may receive a configured grant and downlink control information (DCI) to activate multiple configured grant occasions, or a BS may send DCI associated with scheduling the multiple uplink transmit opportunities. The UE may perform a CCA before each uplink transmit opportunity and initiate a COT when the UE passes a CCA. The UE may transmit on the uplink shared channel to indicate that the channel is available and the UE has initiated the COT. In some examples, the uplink shared channel transmission may include the receiver-side assistance information. For example, the receiver-side assistance information may include measurement information, rank or beam requests, COT information, or buffer information for the UE. In some examples, the BS may apply the receiver-side assistance information for communications with the UE, such as the downlink data transmission sent during the shared COT.

Particular implementations of the subject matter described in this disclosure can be implemented to realize one or more of the following potential advantages. The described techniques may be implemented to provide improved quality for downlink transmissions and increased reliability in a shared radio frequency spectrum band. To improve the communications quality, a UE may provide useful information to a BS for downlink shared channel transmissions. For example, the receiver-side assistance information may include measurement results or beamforming information which may be processed and implemented by the BS to improve channel conditions or signal strength for transmissions to the UE. Additionally, these techniques may ensure reliability for downlink data transmission by sharing a UE-initiated COT with a BS. These techniques may mitigate receiver-side interference for downlink transmissions, as the UE may first determine that the channel is available by performing a CCA. A threshold for the CCA procedure to initiate the COT may be adjustable, improving a likelihood of either a successful downlink transmission or a likelihood of the UE to pass the CCA and start the COT, further increasing throughput for downlink data.

In some cases, receiver-side assistance information may provide enhanced performance for millimeter wave communications in an unlicensed radio frequency spectrum band, where transmission may be highly directional. In some cases, channel sensing (such as CCA or listen-before-talk (LBT)) performed at a transmitter may be mismatched, or not correlated, to the interference conditions at a receiver. Performing channel sensing at the receiver may reduce a mismatch between sensed energy and the actual interference conditions. Providing receiver-side assistance information via a CCA-based sensing may be beneficial compared to receiver-side channel state information (CSI). For example, the CCA performed at the receiver may closely precede a COT, which may provide faster or more timely feedback than a conventional periodic or aperiodic CSI based on earlier-performed measurements.

FIG. 1 illustrates an example of a wireless communications system 100 that supports receiver-side assistance information using multiple uplink transmit opportunities. The wireless communications system 100 may include one or more BSs 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (such as mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a coverage area 110 over which the UEs 115 and the BS 105 may establish one or more communication links 125. The coverage area 110 may be an example of a geographic area over which a BS 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (such as core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (such as via an S1, N2, N3, or another interface). The BSs 105 may communicate with one another over the backhaul links 120 (such as via an X2, Xn, or another interface) either directly (such as directly between BSs 105), or indirectly (such as via core network 130), or both. In some examples, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other examples, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (such as in a carrier aggregation configuration), a carrier also may have acquisition signaling or control signaling that coordinates operations for other carriers. A carrier may be associated with a frequency channel (such as an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (such as of the same or a different radio access technology).

The communication links 125 shown in the wireless communications system 100 may include uplink transmissions from a UE 115 to a BS 105, or downlink transmissions from a BS 105 to a UE 115. Carriers may carry downlink or uplink communications (such as in an FDD mode) or may be configured to carry downlink and uplink communications (such as in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (such as 1.4, 3, 5, 10, 15, 20, 40, or 80 megahertz (MHz)). Devices of the wireless communications system 100 (such as the BSs 105, the UEs 115, or both) may have hardware configurations that support communications over a particular carrier bandwidth or may be configurable to support communications over one of a set of carrier bandwidths. In some examples, the wireless communications system 100 may include BSs 105 or UEs 115 that support simultaneous communications via carriers associated with multiple carrier bandwidths. In some examples, each served UE 115 may be configured for operating over portions (such as a sub-band, a BWP) or all of a carrier bandwidth.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as a duration of one modulation symbol) and one subcarrier, where the symbol period and subcarrier spacing are inversely related. The number of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some examples, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some examples, the TTI duration (such as the number of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (such as over a carrier) and may be associated with an identifier for distinguishing neighboring cells (such as a physical cell identifier (PCID), a virtual cell identifier (VCID), or others). In some examples, a cell also may refer to a geographic coverage area 110 or a portion of a geographic coverage area 110 (such as a sector) over which the logical communication entity operates. Such cells may range from smaller areas (such as a structure, a subset of structure) to larger areas depending on various factors such as the capabilities of the BS 105. For example, a cell may be or include a building, a subset of a building, or exterior spaces between or overlapping with geographic coverage areas 110, among other examples.

A macro cell generally covers a relatively large geographic area (such as several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (such as licensed, unlicensed) frequency bands as macro cells. Small cells may provide unrestricted access to the UEs 115 with service subscriptions with the network provider or may provide restricted access to the UEs 115 having an association with the small cell (such as the UEs 115 in a closed subscriber group (CSG), the UEs 115 associated with users in a home or office). A BS 105 may support one or multiple cells and also may support communications over the one or more cells using one or multiple component carriers.

In some examples, a carrier may support multiple cells, and different cells may be configured according to different protocol types (such as MTC, narrowband IoT (NB-IoT), enhanced mobile broadband (eMBB)) that may provide access for different types of devices.

In some examples, a BS 105 may be movable and therefore provide communication coverage for a moving geographic coverage area 110. In some examples, different geographic coverage areas 110 associated with different technologies may overlap, but the different geographic coverage areas 110 may be supported by the same BS 105. In some other examples, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may support synchronous or asynchronous operation. For synchronous operation, the BSs 105 may have similar frame timings, and transmissions from different BSs 105 may be approximately aligned in time. For asynchronous operation, the BSs 105 may have different frame timings, and transmissions from different BSs 105 may, in some examples, not be aligned in time. The techniques described herein may be used for either synchronous or asynchronous operations.

Some UEs 115, such as MTC or IoT devices, may be low cost or low complexity devices and may provide for automated communication between machines (such as via Machine-to-Machine (M2M) communication). M2M communication or MTC may refer to data communication technologies that allow devices to communicate with one another or a BS 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, a set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 also may be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some examples, groups of the UEs 115 communicating via D2D communications may utilize a one-to-many (1:M) system in which each UE 115 transmits to every other UE 115 in the group. In some examples, a BS 105 facilitates the scheduling of resources for D2D communications. In some other examples, D2D communications are carried out between the UEs 115 without the involvement of a BS 105.

In some systems, the D2D communication link 135 may be an example of a communication channel, such as a sidelink communication channel, between vehicles (such as UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (such as BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (such as radio heads and ANCs) or consolidated into a single network device (such as a BS 105).

As described herein, a BS 105 may include one or more components that are located at a single physical location or one or more components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 (also known as a monolithic BS) or a BS 105 including components that are located at various physical locations or virtualized locations (also known as a disaggregated BS). In some implementations, such a BS 105 including components that are located at various physical locations may be referred to as or may be associated with a disaggregated radio access network (RAN) architecture, such as an Open RAN (O-RAN) or Virtualized RAN (VRAN) architecture. In some implementations, such components of a BS 105 may include or refer to one or more of a central unit (or centralized unit CU), a distributed unit (DU), or a radio unit (RU).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (such as from 30 GHz to 300 GHz), also known as the millimeter band. In some examples, the wireless communications system 100 may support millimeter wave (mmW) communications between the UEs 115 and the BSs 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some examples, operations in unlicensed bands may be based on a carrier aggregation configuration in conjunction with component carriers operating in a licensed band (such as LAA). Operations in unlicensed spectrum may include downlink transmissions, uplink transmissions, P2P transmissions, or D2D transmissions, among other examples.

ABS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some examples, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (such as a BS 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (such as antenna panels) to conduct beamforming operations for directional communications with a UE 115. Some signals (such as synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (such as a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some examples, transmissions by a device (such as by a BS 105 or a UE 115) may be performed using multiple beam directions, and the device may use a combination of digital precoding or radio frequency beamforming to generate a combined beam for transmission (such as from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (such as a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (such as a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (for example, for identifying a beam direction for subsequent transmission or reception by the UE 115) or for transmitting a signal in a single direction (such as for transmitting data to a receiving device).

A receiving device (such as a UE 115) may try multiple receive configurations (such as directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (such as different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (such as when receiving a data signal). The single receive configuration may be aligned in a beam direction determined based on listening according to different receive configuration directions (such as a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (such as automatic repeat request (ARQ)). HARQ may improve throughput at the MAC layer in poor radio conditions (such as low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

As demand for communication resources increases due to an increasing number of wireless devices communicating over the available spectrum, techniques to increase throughput efficiently and reliably are desirable. Some wireless communications systems may use higher bands (such as the 60 GHz range, or higher) of an unlicensed radio frequency spectrum to provide additional bandwidth and further increase throughput.

For unlicensed spectrum (such as shared spectrum) communications, a device may perform a CCA check or a CCA procedure, such as an LBT procedure, to gain access to the channel medium. For some CCA procedures, such as channel access procedures in a 60 GHz band, a device may detect a pending transmission and attempt to initiate a COT for an initiating transmission on a communication channel (such as a PUSCH transmission) in unlicensed spectrum. For example, in the CCA procedure, the device may randomly generate, or determine, a value (such as a random value) for a counter, C, where the value is between a minimum value, $Z_{min}$, and a maximum value, $Z_{max}$. The device may repeatedly perform channel sensing for a minimum of the random number of times. For example, if the channel medium is idle within an observation window (for example, of 8 microseconds), the device may decrement the counter, C. Then, the device may repeat performing (one after another) channel sensing and decreasing the counter, C, as long as the value of the counter, C, is non-zero. If the channel is occupied (such as if the medium is busy), the device may (re-)initiate the CCA procedure or perform another channel sensing with the same counter value, such as after an occupied window of the channel ends. Once the device determines that the channel is not (or no longer) occupied (such as when the medium is free) and the counter, C, is equal to zero, the device may be allowed to occupy the channel by initiating a shared channel transmission. Some wireless communications systems may use an extended CCA procedure (eCCA). An eCCA procedure may support a longer window for performing channel sensing.

A device may initiate a COT upon successfully performing a CCA check or a CCA procedure. The initiating device may share the COT with other, responding devices. The responding devices may not need to perform a CCA procedure to share the COT with the initiating device (for example, when transmitting a response during the COT). In some examples, there may not be a timer for a gap between an initial transmission and a response from the responding device within the COT. For example, there may not be a requirement on how long a gap can be between the initiating device and the responding device transmissions. For example, a UE 115 may detect a pending transmission, perform and pass (for example, successfully performs) a CCA procedure, for the UE 115 to initiate a COT. The UE 115 may share its COT (for example, the UE-initiated COT) with a BS 105. During the UE-initiated COT the BS 105 may be able to perform various transmissions (not only responses) to the UE 115. In some examples, the COT may have one or more uplink portions for uplink transmissions and one or more downlink portions for downlink transmissions.

Some wireless communications systems may use beamformed communications to improve signal strength and reliability. However, the transmitter and receiver in these systems may experience different interference patterns due to highly direction transmissions, especially using beamformed mmW signaling. For example, a BS 105 may not experience the same interference that a UE 115 experiences, so the BS 105 may assume the channel is clear (such as when the channel is not or no longer occupied) for the UE 115 without any additional information from the UE 115. Some of these systems may implement techniques to protect the reception of data from interference.

In some examples, to protect reception of data, a wireless communications system 100 may implement a pre-grant transmission. For example, a BS 105 may transmit a downlink pre-grant, and a UE 115 may transmit an acknowledgment to the pre-grant. The UE 115 may perform a CCA procedure to transmit the acknowledgment to the pre-grant, indicating that the UE has gained access to the wireless channel and can receive a data transmission from the BS 105. The acknowledgment to the pre-grant may enable the UE 115 to confirm that the receiver-side channel is clear enough for reception of data. If the acknowledgment to the pre-grant is not received by the BS 105, the BS 105 may determine that the receiver is being jammed or interfered with by a neighboring device. In some examples, the acknowledgment to the pre-grant may indicate to the BS 105 that the UE 115 is sharing a UE-initiated COT with the BS 105, enabling the BS 105 to use the UE-initiated COT to send downlink data to the UE 115.

Some wireless communications systems may support a configured grant for uplink transmission. A configured grant may provide uplink transmissions opportunities for a UE 115 without additional grants from a BS 105. The configured grant may be configured via RRC signaling. After configuration, a semi-persistent periodic opportunity may be available to the UE 115 for uplink shared channel transmissions (such as for PUSCH transmissions) without a corresponding per-transmission grant. In some examples, the configured grant may be a Type 2 configured grant, which may be activated and deactivated by DCI signaling from the BS 105. The UE 115 may send an acknowledgment for the activating DCI in a MAC control element (CE).

Some wireless communications systems support scheduling multiple uplink shared channel opportunities with a single DCI for a UE 115 to transmit a transport block. For example, a BS 105 may transmit DCI to enable slot aggregation for a UE 115 to transmit the same transport block on different slots without HARQ. In some examples, the UE 115 may transmit the same transport block with different redundancy versions.

Techniques described herein provide for a UE 115 to initiate a COT and send receiver-side assistance information when sharing the COT with a BS. Multiple uplink shared channel transmit opportunities, such as by a configured grant or physical uplink shared channel (PUSCH) slot aggregation, may be indicated to the UE 115. In some examples, DCI activating the configured grant or DCI scheduling the multiple uplink transmit opportunities for slot aggregation may be similar to a pre-grant. If the UE 115 passes a CCA procedure prior to one of the uplink transmit opportunities and initiates a COT, the UE 115 may transmit receiver-side assistance information on an uplink shared channel (such as on PUSCH) to indicate the UE-initiated COT to the BS 105. In some examples, the uplink shared channel transmission may be similar to an acknowledgment to a pre-grant. The receiver-side assistance information may be used to improve the quality of communications with the BS 105, such as measurement information, buffer status information, beam or rank requests, or any combination thereof. Transmitting the receiver-side assistance information may indicate to the BS 105 that the UE 115 is sharing the UE-initiated COT with the BS 105, and the BS 105 may transmit downlink data to the UE 115 during the UE-initiated COT.

Some additional techniques are described for the different implementations. For example, using a configured grant implementation, a BS 105 may transmit an activating DCI multiple times, which may provide robustness for activating the configured grant in the example of interference at the UE 115. In some examples, a BS 105 may have a delay for processing the receiver-side assistance information. In this example, the BS 105 may transmit the data transmission using a set of default values (such as a default or previous beam configuration) and implement values or configurations based on the receiver-side assistance information in the data transmission after processing the receiver-side information.

In some examples of a PUSCH slot aggregation implementation, the UE 115 may be scheduled for multiple-opportunity sounding reference signal (SRS) transmissions or multiple-opportunity uplink data transmissions. For example, in some examples, the UE 115 may receive DCI scheduling multiple SRS opportunities on a PUSCH, and in some examples the UE 115 may receive DCI scheduling multiple uplink transmit opportunities for data on the PUSCH. In some examples, after passing a CCA procedure, the UE 115 may transmit an indication of the UE-initiated COT on each subsequent PUSCH opportunity, and the BS 105 may use the downlink portion of the COT to schedule downlink data transmissions in the remaining portion of the COT. For example, after passing the CCA procedure, the UE 115 may transmit the receiver-side assistance information on each remaining scheduled PUSCH transmit opportunity.

Figure 2:
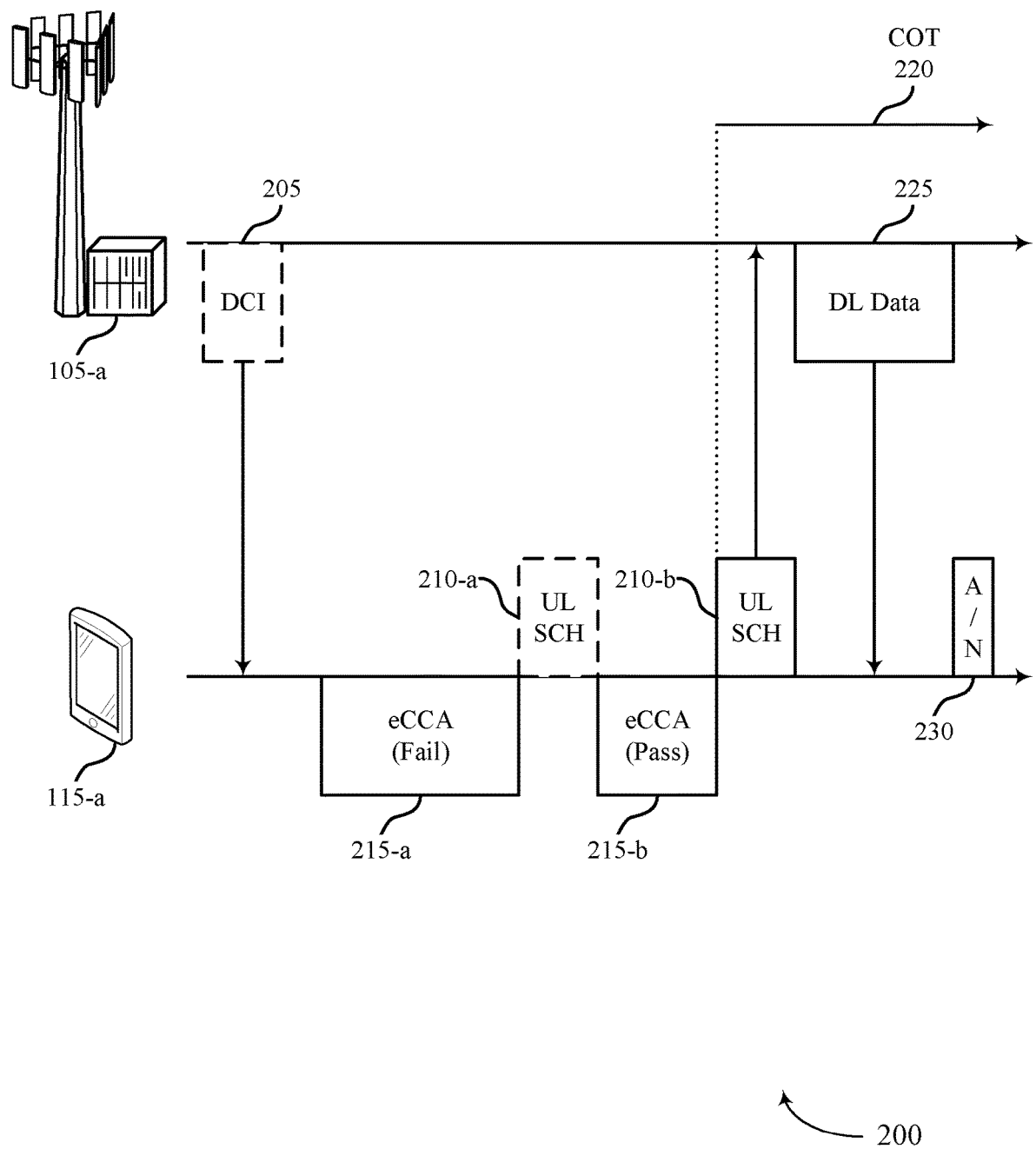
FIGS. 2-4 illustrate examples of network architectures that support receiver-side assistance information using multiple uplink transmit opportunities.

FIG. 2 illustrates an example of a network architecture 200 that supports receiver-side assistance information using multiple uplink transmit opportunities. The network architecture 200 illustrates communication between UE 115-*a* and BS 105-*a*, which may be respective examples of a UE 115 and a BS 105 as described with reference to FIG. 1.

UE 115-*a* and BS 105-*a* may communicate using an unlicensed radio frequency spectrum band. UE 115-*a* and BS 105-*a* may support techniques to utilize a UE-initiated COT for a downlink data transmission from BS 105-*a*. To initiate the COT 220, UE 115-*a* may perform a CCA 215 and transmit on an uplink shared channel (such as on a PUSCH) to BS 105-*a*. The CCA 215 may be an example of a CCA procedure or a CCA check described herein. UE 115-*a* may include receiver-side assistance information in the uplink shared channel transmission. In some cases, a PUSCH transmission may be an example of the uplink shared channel transmission.

UE 115-*a* may receive an indication of a set of uplink transmit opportunities 210. The set of uplink transmit opportunities may include at least uplink transmit opportunity 210-*a* and uplink transmit opportunity 210-*b*. For example, UE 115-*a* may receive a configured grant via RRC signaling indicating a set of configured grant occasions. In some examples, BS 105-*a* may transmit DCI 205 to activate the configured grant. In some examples, short control signaling transmissions (for example, less than approximately 10 ms) such as DCI 205 may be performed by the BS 105-*a* without sensing the channel. When the configured grant is active, UE 115-*a* may perform a CCA 215, such as CCA 215-*a* or CCA 215-*b*, prior to each configured grant occasion, attempting to gain access to the channel (or medium). In some examples, the DCI 205 may be an example of a receiver assistance DCI or an activating DCI for a Type 2 configured grant. In some examples, the DCI 205 activating the configured grant may be same or similar to a pre-grant. In other examples, the DCI 205 may schedule the set of uplink transmit opportunities 210, for example using a slot aggregation technique. For example, the UE 115-*a* may receive an indication to use slot aggregation via RRC signaling indicating an aggregation factor for PUSCH. BS 105-*a* may schedule the set of uplink transmit opportunities 210 for UE 115-*a* to transmit multiple repetitions on the uplink shared channel, each of which may include the receiver-side assistance information.

If a CCA 215 fails, UE 115-*a* may not transmit on the corresponding (or subsequent) uplink transmit opportunity 210. For example, UE 115-*a* may perform CCA 215-*a* prior to uplink transmit opportunity 210-*a*, and CCA 215-*a* may fail due to interference. UE 115-*a* may not obtain the channel medium due to the failed CCA, and UE 115-*a* may not transmit during the subsequent uplink transmit opportunity 210-*a*.

To perform a CCA 215, UE 115-*a* may perform carrier sensing or energy detection on the channel (or medium). UE 115-*a* may compare the detected energy to an energy detection threshold. In some examples, the CCA 215 may be successful (for example, passes) if the detected energy is below the energy detection threshold, and the CCA 215 may be unsuccessful (such as if the CCA 215 fails) if the detected energy is above the energy detection threshold. In some examples, the energy detection threshold may be a base energy detection threshold, $EDT_0$, which also may be applied for other CCA performed by UE 115-*a*, such as CCAs which are not prior to uplink shared channel transmit opportunities associated with receiver-side assistance information.

The network architecture 200 may support an adjustable energy detection for a CCA 215. For example, an energy detection threshold, $EDT_1$, for a CCA 215, such as CCAs which are prior to uplink shared channel transmit opportunities associated with receiver-side assistance information, may be based on a base energy detection threshold, $EDT_0$, and an energy detection threshold adjustment, $\Delta T_1$, where $EDT_1 = EDT_0 + \Delta T_1$. Adjusting the energy detection threshold may enable an uplink shared channel gating to be configured to respond to a tolerable interference level. For example, the energy detection threshold adjustment may modify a base energy detection threshold to allow slightly more or less noise or interference for a successful CCA. In some examples, BS 105-*a* may transmit an indication of the threshold adjustment to UE 115-*a* via DCI (such as the DCI 205), RRC configuration signaling, system information signaling (such as remaining minimum system information (RMSI) signaling), or any combination thereof.

In some examples, the energy detection threshold adjustment may be selected by BS 105-*a* based on channel conditions, such as channel occupancy, signal quality or signal strength measurements, or energy detection measurements. The channel conditions may be determined by BS 105-*a* by performing measurements, or UE 115-*a* may report the channel conditions to BS 105-*a*, or both. In some examples, UE 115-*a* may determine the energy detection threshold adjustment. For example, UE 115-*a* may determine the energy detection threshold adjustment based on measuring one or more channel conditions. Additionally, or alternatively, the energy detection threshold adjustment may be preconfigured at UE 115-*a*, such as by a specification for the network architecture 200.

In some examples, the network architecture 200 may support a different, or second, energy detection threshold for the CCA 215. For example, a CCA 215 which is associated with an uplink transmit opportunity 210 to send receiver-side assistance information may have a different energy detection threshold than other CCAs. In some examples, UE 115-*a* may use the second energy detection threshold if a CCA 215 is performed prior to an uplink shared channel transmit opportunity to acquire a COT 220 which is used to carry downlink HARQ retransmissions. For example, CCA 215-*b* may be performed based on the second energy detection threshold if the downlink data 225 includes a downlink HARQ retransmission. The second energy detection threshold may be adjusted to provide a minimum signal to interference plus noise ratio (SINR) to accommodate a fixed modulation and coding scheme (MCS) constraint for HARQ retransmission.

In some examples, a UE-initiated COT obtained based on the second energy detection threshold may have a higher likelihood for a successful downlink HARQ retransmission than a BS-initiated COT with a CSI report. For example, the second energy detection threshold may be lower than the base energy detection threshold, such that UE 115-*a* passes a CCA 215 only when there is very little or no interference. In some examples, BS 105-*a* may transmit an indication of the second energy detection threshold to UE 115-*a* via DCI (such as the DCI 205), RRC configuration signaling, system information (such as RMSI), or any combination thereof. Additionally, or alternatively, the UE 115-*a* may be preconfigured with the energy detection threshold adjustment, such as by a specification for the network architecture 200.

When UE 115-*a* passes a CCA 215, UE 115-*a* may obtain the channel (or medium) and initiate a COT 220. For example, UE 115-*a* may perform CCA 215-*b* prior to uplink transmit opportunity 210-*b*, and CCA 215-*b* may be successful. UE 115-*a* may transmit receiver-side assistance information on an uplink shared channel during uplink transmit opportunity 210-*b* as part of the COT 220. In some examples, the uplink shared channel transmission during uplink transmit opportunity 210-*b* may be same or similar to an acknowledgment to a pre-grant, indicating that UE 115-*a* has initiated the COT 220. In some examples, the uplink shared channel transmission may share the COT 220 with BS 105-*a*, such that the COT 220 is an uplink and downlink shared COT or the COT 220 may be used for both, uplink shared channel and downlink shared channel transmission. In some examples, uplink transmit opportunity 210-*b* may be a configured grant occasion. In some examples, uplink transmit opportunity 210-*b* may be scheduled by DCI as one of multiple uplink data transmission opportunities or one of multiple SRS transmission opportunities.

The receiver-side assistance information transmitted during uplink transmit opportunity 210-*b* may include information to improve communications with BS 105-*a*. In some examples, the receiver-side assistance information may include a downlink CSI report, a reference signal received power (RSRP) measurement (such as a Layer 1 RSRP measurement), an SINR measurement (such as a Layer 1 SINR measurement), or any combination thereof. Additionally, or alternatively, the receiver-side information may include a request for a downlink rank (such as a rank indicator, RI), a request for one or more downlink beams (such as a beam failure request, BFR), or any combination thereof. In some examples, the request for the downlink rank may be an indication of a downlink rank, and the request for the one or more downlink beams may be an indication of a one or more downlink beams. The one or more requested downlink beams may be determined based on characteristics of a directional sensing unit used to clear CCA 215-*b*. In some examples, the receiver-side assistance information may indicate a requested COT duration. For example, a channel access priority of CCA 215-*a* or a used energy detection threshold may change a permitted COT duration, and UE 115-*a* may indicate the requested COT duration based on the change. In some examples, the receiver-side assistance information may include an uplink buffer status report (BSR) or a requested downlink portion of the COT 220, or both. For example, a remaining part of the COT 220 (such as outside of the downlink portion) may be scheduled by BS 105-*a* for uplink data.

BS 105-*a* may receive the receiver-side assistance information on the uplink shared channel during uplink transmit opportunity 210-*b*. Based on receiving the receiver-side assistance information on the uplink shared channel, BS 105-a may determine that UE 115-a has initiated the COT 220. By transmitting to BS 105-a during uplink transmit opportunity 210-b in the COT 220, UE 115-a may share the COT 220 with BS 105-a. BS 105-a may process the receiver-side assistance information and, in some examples, apply the receiver-side assistance information to transmit the downlink data 225.

BS 105-a may schedule the downlink data 225 based on a configuration or a set of rules for the COT 220. BS 105-a may transmit the downlink data 225 as scheduled to UE 115-a during the COT 220. In some examples, the downlink data may include a HARQ retransmission. UE 115-a may monitor for the downlink data 225 during a downlink portion of the COT 220. UE 115-a may transmit feedback 230, such as acknowledgment HARQ feedback, to BS 105-a for the downlink data 225.

Figure 3:
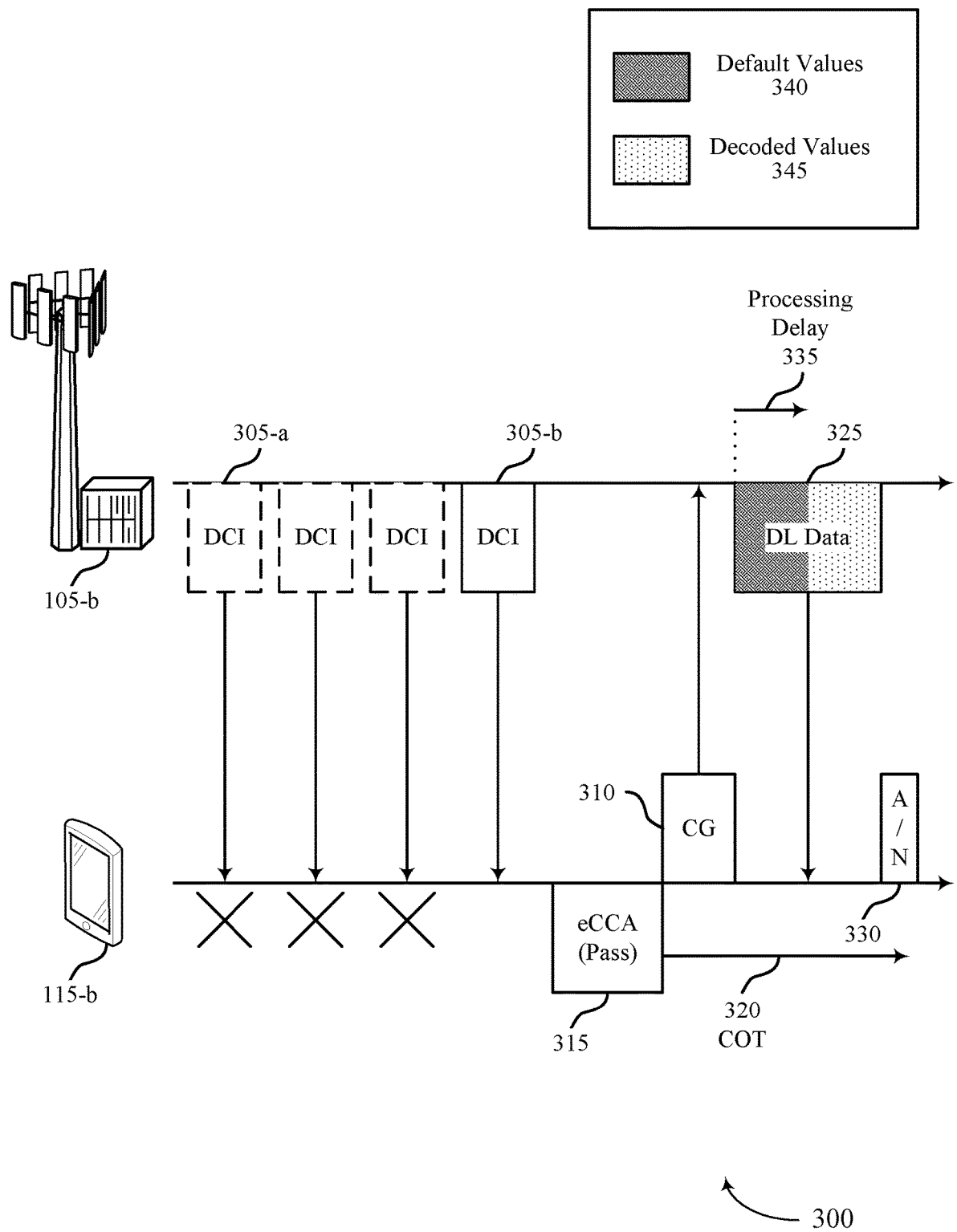

FIG. 3 illustrates an example of a network architecture 300 that supports receiver-side assistance information using multiple uplink transmit opportunities. The network architecture 300 illustrates communication between UE 115-b and BS 105-b, which may be respective examples of a UE 115 and a BS 105 as described herein, such as with reference to FIG. 1 and FIG. 2.

UE 115-b and BS 105-b may communicate using an unlicensed radio frequency spectrum band. UE 115-b and BS 105-b may support techniques to share a UE-initiated COT 320 with BS 105-b for a downlink data transmission. The network architecture 300 illustrates examples implementing a configured grant, allocating a set of configured grant occasions 310. UE 115-b may perform a CCA 315 prior to a configured grant occasion 310 and, if successful, send receiver-side assistance information and share a UE-initiated COT 320 with BS 105-b. A CCA 315 may be an example of a CCA check or a CCA procedure described herein.

UE 115-b may receive an indication of a set of, or a plurality of, uplink transmit opportunities. For example, UE 115-b may receive a configured grant via RRC signaling indicating a set of configured grant occasions. BS 105-b may transmit DCI 305, such as DCI 305-a, to activate the configured grant. In some examples, short control signaling transmissions (such as less than 10 ms) may be performed by the BS 105-b without sensing the channel. For example, BS 105-b may transmit DCI 305-a without sensing the channel such that DCI 305-a may not be (correctly) received by UE 115-b (such as due to interfering transmissions on the channel). When the configured grant is active, UE 115-b may perform a CCA 315 prior to each configured grant occasion, attempting to gain access to the channel (or medium). In some examples, the DCI 305 may be an example of a receiver assistance DCI or an activating DCI for a Type 2 configured grant. The DCI 305 may be same or similar to a pre-grant, which may be used to determine that a receiver-side channel at UE 115-b is available for data reception.

In some examples, BS 105-b may transmit repetitions of the DCI 305. For example, UE 115-b may experience interference from an aggressor device, which may affect the reception or decoding of the DCI 305. Due to the interference, some repetitions of the DCI 305, such as DCI 305-a, may not be correctly decoded by UE 115-b. BS 105-b may transmit a set of repetitions of the DCI 305 to improve a likelihood that UE 115-b successfully receives the DCI 305. For example, UE 115-b may correctly decode a later repetition, such as DCI 305-b. In some examples, UE 115-b may successfully decode DCI 305-b based on the aggressor device ceasing the interfering transmissions. Additionally, or alternatively, UE 115-b may use the previous transmitted repetitions to successfully decode DCI 305-b. Repeating transmission of the receiver-assistance DCI to activate the receiver-assistance configured grant may increase robustness for the DCI 305.

UE 115-b may initiate the COT 320 based on a successful CCA (such as the CCA 315) performed in connection with the configured grant occasion 310. UE 115-b may transmit receiver-side assistance information on an uplink shared channel at a configured grant occasion 310 during the COT 320, the receiver-side assistance information indicating the COT 320. In some examples, the uplink shared channel transmission during the configured grant occasion 310 may be similar to an acknowledgment to a pre-grant, indicating that UE 115-b has initiated the COT 320. In some examples, the uplink shared channel transmission during the configured grant occasion 310 may include an acknowledgment for each repeated receiver-side assistance DCI, such as the DCI 305. For example, UE 115-b may transmit a single MAC CE to acknowledge each repeated receiver-side assistance DCI. In some implementations, the uplink shared channel transmission may share the COT 320 with BS 105-b, such that the COT 320 is an uplink and downlink shared COT, or the COT 320 may be used for both uplink shared channel and downlink shared channel transmission. The receiver-side assistance information transmitted during the configured grant occasion 310 may include information to improve communications with BS 105-b.

In some examples, the uplink shared channel transmission during the configured grant occasion 310 may not include a payload (such as control information, only). For example, UE 115-b may transmit the receiver-side assistance information during the configured grant occasion 310 without a payload. In some examples, the uplink shared channel transmission during the configured grant occasion 310 may include UE 115-b performing an uplink control information transmission on the PUSCH.

BS 105-b may receive the receiver-side assistance information and begin processing the receiver-side assistance information. Based on receiving the receiver-side assistance information on the uplink shared channel, BS 105-b may determine that UE 115-b has initiated the COT 320.

In some examples, BS 105-b may have a processing delay 335 in order to fully process the receiver-side assistance information. For example, BS 105-b may not be able to implement the receiver-side assistance information until after the processing delay 335 has elapsed. However, BS 105-b may begin transmitting the downlink data 325 as soon as a downlink portion of the COT 320 begins. In some examples, BS 105-b may transmit the downlink data 325 using a set of default values 340 until the processing delay 335 is over. For example, BS 105-b may use a previously configured beam, rank, etc., which may have been used for previous transmission to UE 115-b. Once the receiver-side assistance information is processed, BS 105-b may transmit the downlink data 325 using values which were decoded from the receiver-side assistance information. For example, BS 105-b may switch to transmitting using a requested beam indicated by the receiver-side assistance information after the processing delay 335.

UE 115-b may monitor for a downlink shared channel transmission during the COT based on the receiver-side assistance information. For example, UE 115-b may monitor for the downlink data 325 during a downlink portion of the COT 320. UE 115-b may transmit feedback 330, such as acknowledgment HARQ feedback, to BS 105-b for the downlink data 325. In some examples, UE 115-b may monitor for the downlink data 325 according to the set of default values 340 until the processing delay 335 has elapsed. UE 115-b may monitor for the downlink data 325 using a configuration based on the decoded values 345 or information included in the receiver-side assistance information.

In some examples, the configured grant may have a low periodicity to provide UE 115-b more frequent attempts at obtaining the COT 320. However, BS 105-b may need to be capable of reception at each configured grant occasion. In some examples, wireless communications systems described herein, such as the network architecture 300, may support a lower priority level for a configured grant associated with receiver-side assistance information. Assigning a lower priority level for a receiver-side assistance information configured grant may enable BS 105-b to override a configured grant occasion by transmitting a slot format indicator (SFI) with a higher priority. For example, the configured grant may be set with a configured grant configuration priority other than '1' (such as configured with a low priority). This may provide a low periodicity for the receiver-side assistance information configured grant without BS 105-b being available for each configured grant occasion. For example, if BS 105-b has an overlapping communication with a configured grant occasion, BS 105-b may transmit an SFI to UE 115-b to disable the configured grant occasion. UE 115-b may skip the configured grant occasion and perform a CCA at a subsequent configured grant occasion. The SFI may be signaled via DCI sent to a slot format radio network temporary identifier (SF-RNTI) to override a configured grant uplink slot. In some examples, short control signaling transmissions (such as less than 10 ms), such as a DCI carrying the SFI, may be performed by the BS 105-b without sensing the channel. In other examples, BS 105-b may enable or disable configured grant occasions using an SFI.

Figure 4:
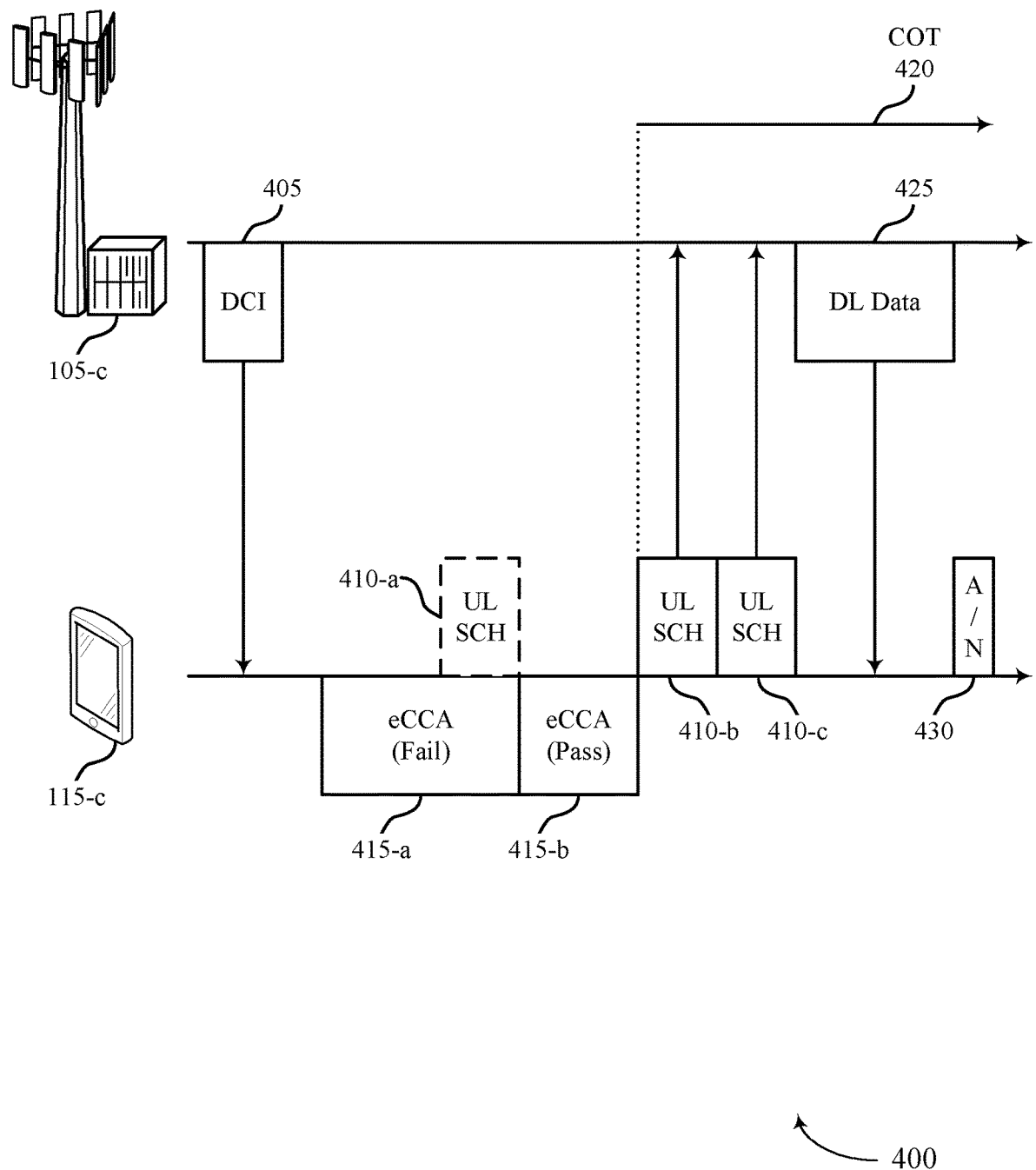

FIG. 4 illustrates an example of a network architecture 400 that supports receiver-side assistance information using multiple uplink transmit opportunities. The network architecture 400 illustrates communication between UE 115-c and BS 105-c, which may be respective examples of a UE 115 and a BS 105 as described herein.

UE 115-c and BS 105-c may communicate using an unlicensed radio frequency spectrum band. UE 115-c and BS 105-c may support techniques to utilize a UE-initiated COT for a downlink data transmission from BS 105-c. To initiate the COT, UE 115-c may (successfully) perform a CCA and transmit on an uplink shared channel to BS 105-c. UE 115-c may include receiver-side assistance information in the uplink shared channel transmission. The network architecture 400 illustrates examples of using slot aggregation to provide a set of uplink transmit opportunities for transmitting the receiver-side assistance information.

In an example, UE 115-c may receive an indication of a set of uplink transmit opportunities 410. For example, the set of uplink transmit opportunities 410 may include uplink transmit opportunity 410-a, uplink transmit opportunity 410-b, and uplink transmit opportunity 410-c. In some examples, UE 115-c may receive a DCI 405 scheduling the set of uplink transmit opportunities 410 (such as DCI 405 including a dynamic grant with an aggregation factor). The DCI 405 may, for example, schedule UE 115-c to transmit multiple repetitions of a transport block, implementing slot aggregation techniques described herein. In other examples, the DCI 405 may schedule UE 115-c for multiple SRS transmissions during the set of uplink transmit opportunities 410 (such as DCI 405 including a SRS resource indicator). In some examples, the DCI 405 may be similar to a pre-grant described herein.

UE 115-c may perform a (successful) CCA 415, such as CCA 415-a or CCA 415-b, prior to an uplink transmit opportunity 410. In some cases, UE 115-c may perform at least one CCA procedure (such as a CCA 415) for at least one of the set of uplink transmit opportunities 410 based on the DCI 405. If a CCA 415 before an uplink transmit opportunity 410 fails, or is unsuccessful, UE 115-c may not transmit on the corresponding uplink transmit opportunity 410. For example, UE 115-c may perform CCA 415-a prior to uplink transmit opportunity 410-a, and CCA 415-a may fail due to interference from neighboring devices. UE 115-c may not obtain the channel medium due to the failed CCA, and UE 115-c may not transmit during uplink transmit opportunity 410-a.

When UE 115-c passes a CCA 415, such as when CCA 415 is successful, UE 115-c may obtain the channel (such as medium) and initiate a COT 420. For example, UE 115-c may perform CCA 415-b prior to uplink transmit opportunity 410-b, and CCA 415-b may be successful. UE 115-c may transmit receiver-side assistance information on an uplink shared channel at uplink transmit opportunity 410-b as part of the COT 420. In some examples, the uplink shared channel transmission during uplink transmit opportunity 410-b may be similar to an acknowledgment to a pre-grant, indicating that UE 115-c has initiated the COT 420. In some examples, the uplink shared channel transmission may share the COT 420 with BS 105-c, such that the COT 420 is an uplink and downlink shared COT or the COT 420 may be used for both, uplink shared channel and downlink shared channel transmission.

In some examples, UE 115-c may transmit an SRS at uplink transmit opportunity 410-b. For example, BS 105-c may use a grant to trigger UE 115-c to perform a CCA check (such as a CCA 415) for an SRS transmission. The SRS transmission may be detected by BS 105-c as a condition to share the UE-initiated COT for a downlink data transmission. For example, a dynamically triggered SRS, such as the SRS transmitted during uplink transmit opportunity 410-b, may be used to indicate the UE-initiated COT and share the UE-initiated COT with BS 105-c.

The receiver-side assistance information transmitted during uplink transmit opportunity 410-b may include information to improve communications with BS 105-c. In some examples, UE 115-c may transmit on the PUSCH during any subsequent uplink transmit opportunities 410. For example, after passing CCA 415-b (such as when CCA 415-b is successful), UE 115-c may be scheduled for uplink transmit opportunity 410-b and uplink transmit opportunity 410-c. UE 115-c may send uplink shared channel transmissions during uplink transmit opportunity 410-b and uplink transmit opportunity 410-c. In some examples, UE 115-c may send the receiver-side assistance information on both of the remaining uplink transmit opportunities 410. A downlink portion of the COT 420 may be scheduled in a remaining part of the COT 420 after the set of uplink transmit opportunities 410. In some other examples, UE 115-c may transmit the receiver-side assistance information once, and BS 105-c may use the rest of the COT 420 for the downlink portion to transmit the downlink data 425.

In some examples, UE 115-c may not use the subsequent uplink transmit opportunities 410. For example, UE 115-c may transmit on uplink transmit opportunity 410-b and not uplink transmit opportunity 410-c. In some aspects, UE 115-c may cancel the subsequent uplink transmit opportunities, such as uplink transmit opportunity 410-c. For example, UE 115-c may cancel a pending scheduling request (SR) when the uplink shared channel transmission in uplink transmit opportunity 410-b can accommodate all pending data. In some examples, BS 105-c may reuse resources canceled by UE 115-c for downlink signaling. For example, after receiving the receiver-side assistance information at uplink transmit opportunity 410-b, BS 105-c may determine that UE 115-c has cancelled or will not use any of the following uplink transmit opportunities 410 in the COT 420, and BS 105-c may use more of the COT 420 for downlink transmission.

BS 105-c may receive the receiver-side assistance information on the uplink shared channel during uplink transmit opportunity 410-b. Based on receiving the transmission on the uplink shared channel, BS 105-c may determine that UE 115-c has initiated the COT 420. BS 105-c may process the receiver-side assistance information and, in some examples, apply the receiver-side assistance information for the downlink data 425.

BS 105-c may schedule the downlink data 425 based on a configuration or a set of rules for the COT 420. For example, BS 105-c may transmit the downlink data 425 during a configured downlink portion of the COT 420. In some examples, the downlink portion of the COT 420 may be indicated by the receiver-side assistance information. BS 105-c may transmit the downlink data 425 as scheduled to UE 115-c during the COT 420. In some examples, the downlink data may include a HARQ retransmission. UE 115-c may monitor for the downlink data 425 during a downlink portion of the COT 420. UE 115-c may transmit feedback 430, such as acknowledgment HARQ feedback, to BS 105-c for the downlink data 425.

Figure 5:
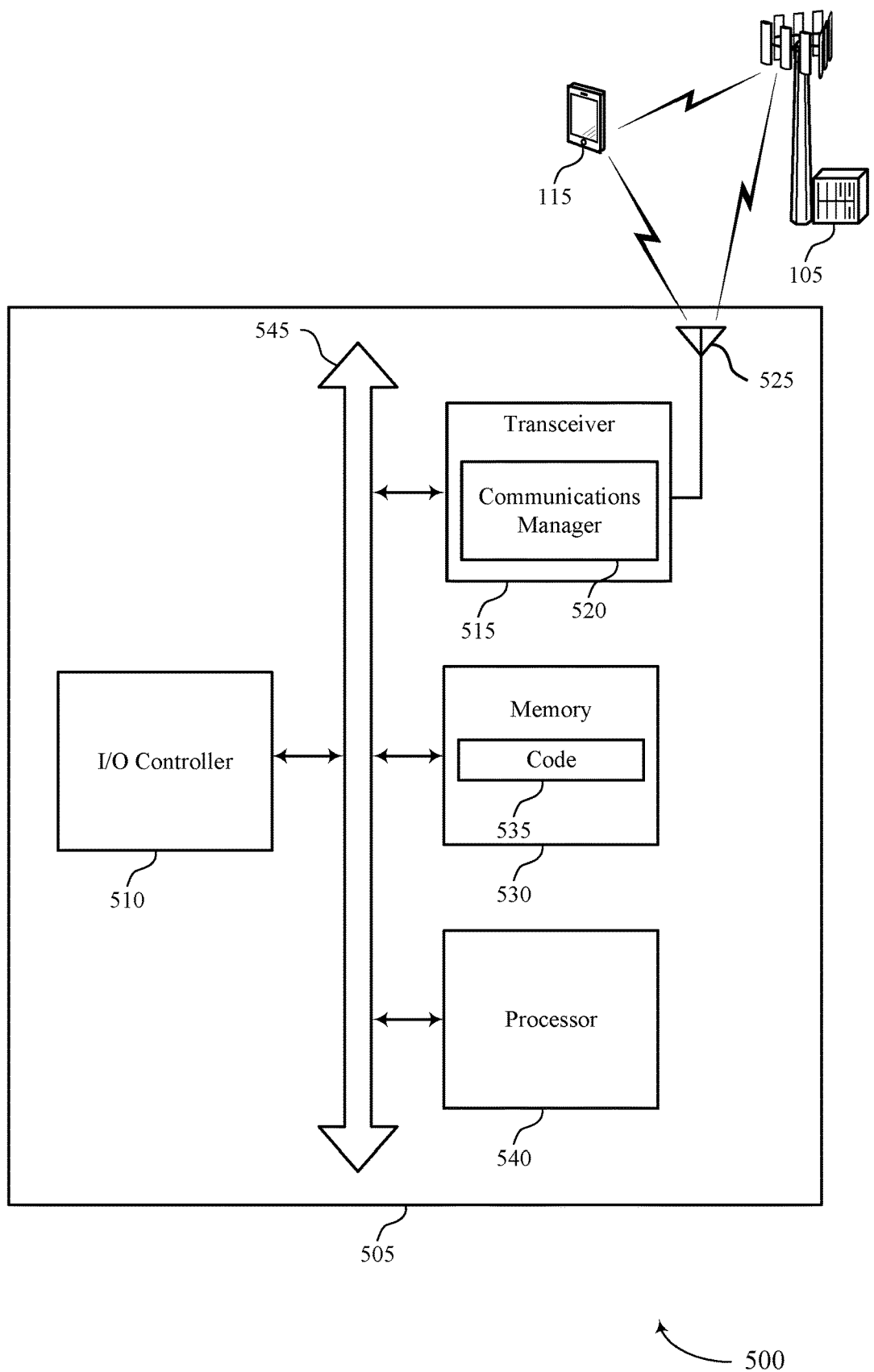
FIGS. 5 and 6 show block diagrams of example devices that support receiver-side assistance information using multiple uplink transmit opportunities.

FIG. 5 shows a diagram of a system 500 including a device 505 that supports receiver-side assistance information using multiple uplink transmit opportunities. The device 505 may be an example of or include the components of a UE 115 as described herein, including with reference to FIGS. 1-5. The device 505 may communicate wirelessly with one or more BSs 105, UEs 115, or any combination thereof. The device 505 may include components for bi-directional voice and data communications including components for transmitting and receiving communications, such as a communications manager 520, an input/output (I/O) controller 510, a transceiver 515, an antenna 525, a memory 530, code 535, and a processor 540. These components may be in electronic communication or otherwise coupled (such as operatively, communicatively, functionally, electronically, electrically) via one or more buses (such as a bus 545).

The communications manager 520 may support wireless communications at a UE in accordance with examples as disclosed herein. The communications manager 520 may be configured as or otherwise support a means for receiving an indication of a set of multiple uplink transmit opportunities, or a plurality of uplink transmit opportunities. The communications manager 520 may be configured as or otherwise support a means for initiating a COT based on a successful CCA performed prior to a first uplink transmit opportunity of the set of multiple uplink transmit opportunities. The communications manager 520 may be configured as or otherwise support a means for transmitting receiver-side assistance information during the first uplink transmit opportunity on an uplink shared channel in shared spectrum, the receiver-side assistance information indicating that the COT is initiated. The communications manager 520 may be configured as or otherwise support a means for monitoring for a downlink shared channel transmission in the shared spectrum during the COT based on the receiver-side assistance information.

In some examples, to support transmitting the receiver-side assistance information, the communications manager 520 may be configured as or otherwise support a means for transmitting the receiver-side assistance information on the uplink shared channel at each remaining uplink transmit opportunity of the set of multiple uplink transmit opportunities, where the monitoring for the downlink shared channel transmission occurs after the set of multiple uplink transmit opportunities.

In some examples, the communications manager 520 may be configured as or otherwise support a means for cancelling remaining uplink transmit opportunities of the set of multiple uplink transmit opportunities based on outputting the receiver-side assistance information on the uplink shared channel. In some examples, the communications manager 520 may be configured as or otherwise support a means for monitoring for the downlink shared channel transmission at least partially during the canceled remaining uplink transmit opportunities.

In some examples, to support transmitting the receiver-side assistance information, the communications manager 520 may be configured as or otherwise support a means for transmitting an SRS including the receiver-side assistance information on the uplink shared channel.

In some examples, the communications manager 520 may be configured as or otherwise support a means for receiving an indication of an energy detection threshold adjustment via DCI, RRC signaling, system information signaling, or any combination thereof, where the successful CCA is performed according to the energy threshold detection adjustment.

In some examples, the communications manager 520 may be configured as or otherwise support a means for determining an energy detection threshold based on the downlink shared channel transmission being a downlink HARQ retransmission, where the successful CCA is performed according to the energy detection threshold.

In some examples, the communications manager 520 may be configured as or otherwise support a means for receiving an indication of the energy detection threshold via DCI, RRC signaling, system information signaling, or any combination thereof.

In some examples, the receiver-side assistance information includes a CSI report, an RSRP measurement, an SINR measurement, a requested downlink rank indication, a requested beam indication, a requested COT duration indication, an uplink buffer status report, a requested downlink portion of the COT, or any combination thereof.

In some examples, to support monitoring for the downlink shared channel transmission, the communications manager 520 may be configured as or otherwise support a means for receiving a first portion of the downlink shared channel transmission based on a default configuration. In some examples, to support monitoring for the downlink shared channel transmission, the communications manager 520 may be configured as or otherwise support a means for receiving, after a delay from the COT based on a processing delay at a BS, a second portion of the downlink shared channel transmission including information based on the receiver-side assistance information.

In some examples, to support receiving the indication of the set of multiple uplink transmit opportunities, the communications manager 520 may be configured as or otherwise support a means for receiving a downlink control information scheduling the set of multiple uplink transmit opportunities.

In some examples, to support receiving the indication of the set of multiple uplink transmit opportunities, the communications manager 520 may be configured as or otherwise support a means for receiving a configured grant indicating a set of multiple configured grant occasions, where the set of multiple uplink transmit opportunities are the set of multiple configured grant occasions.

In some examples, the communications manager 520 may be configured as or otherwise support a means for receiving DCI activating the configured grant, where the successful CCA is performed based on receiving the DCI.

In some examples, the communications manager 520 may be configured as or otherwise support a means for receiving DCI from a base station. In some examples, the communications manager 520 may be configured as or otherwise support a means for performing at least one CCA procedure for at least one of the set of multiple uplink transmit opportunities based on the DCI.

In some examples, the communications manager 520 may be configured as or otherwise support a means for transmitting, in response to receiving the DCI, a MAC CE including acknowledgment feedback for the DCI.

In some examples, to support receiving the DCI activating the configured grant, the communications manager 520 may be configured as or otherwise support a means for detecting a set of multiple repetitions of the DCI activating the configured grant, where the MAC CE indicates acknowledgment feedback for the set of multiple repetitions of the DCI.

In some examples, the communications manager 520 may be configured as or otherwise support a means for receiving DCI including an SFI indicating a slot format during a second uplink transmit opportunity, where the set of multiple uplink transmit opportunities are associated with a lower priority than the DCI including the SFI. In some examples, the communications manager 520 may be configured as or otherwise support a means for communicating according to the SFI during the second uplink transmit opportunity based on the lower priority of the set of multiple uplink transmit opportunities.

In some examples, the successful CCA follows one or more unsuccessful CCAs associated with corresponding uplink transmit opportunities preceding the first uplink transmit opportunity.

The I/O controller 510 may manage input and output signals for the device 505. The I/O controller 510 also may manage peripherals not integrated into the device 505. In some examples, the I/O controller 510 may represent a physical connection or port to an external peripheral. In some examples, the I/O controller 510 may utilize an operating system such as iOS®, ANDROID®, MS-DOS®, MS-WINDOWS®, OS/2®, UNIX®, LINUX®, or another known operating system. Additionally, or alternatively, the I/O controller 510 may represent or interact with a modem, a keyboard, a mouse, a touchscreen, or a similar device. In some examples, the I/O controller 510 may be implemented as part of a processor, such as the processor 540. In some examples, a user may interact with the device 505 via the I/O controller 510 or via hardware components controlled by the I/O controller 510.

In some examples, the device 505 may include a single antenna 525. However, in some other examples, the device 505 may have more than one antenna 525, which may be capable of concurrently transmitting or receiving multiple wireless transmissions. The transceiver 515 may communicate bi-directionally, via the one or more antennas 525, wired, or wireless links as described herein. For example, the transceiver 515 may represent a wireless transceiver and may communicate bi-directionally with another wireless transceiver. The transceiver 515 also may include a modem to modulate the packets, to provide the modulated packets to one or more antennas 525 for transmission, and to demodulate packets received from the one or more antennas 525.

The memory 530 may include random access memory (RAM) and read-only memory (ROM). The memory 530 may store computer-readable, computer-executable code 535 including instructions that, when executed by the processor 540, cause the device 505 to perform various functions described herein. The code 535 may be stored in a non-transitory computer-readable medium such as system memory or another type of memory. In some examples, the code 535 may not be directly executable by the processor 540 but may cause a computer (such as when compiled and executed) to perform functions described herein. In some examples, the memory 530 may contain, among other things, a basic I/O system (BIOS) which may control basic hardware or software operation such as the interaction with peripheral components or devices.

In some implementations, the processor 540 may be a component of a processing system. A processing system may generally refer to a system or series of machines or components that receives inputs and processes the inputs to produce a set of outputs (which may be passed to other systems or components of, for example, a BS 105). For example, a processing system of a BS 105 may refer to a system including the various other components or subcomponents of a BS 105.

The processing system of the BS 105 may interface with other components of the BS 105 and may process information received from other components (such as inputs or signals) and output information to other components. For example, a chip or modem of the BS 105 may include a processing system, a first interface to receive or obtain information, and a second interface to output, transmit, or provide information. In some implementations, the first interface may refer to an interface between the processing system of the chip or modem and a receiver, such that the BS 105 may receive information or signal inputs, and the information may be passed to the processing system. In some implementations, the second interface may refer to an interface between the processing system of the chip or modem and a transmitter, such that the BS 105 may transmit information output from the chip or modem. One of skill in the art will readily recognize that the second interface also, or alternatively, may obtain or receive information or signal inputs, and the first interface also, or alternatively, may output, transmit, or provide information.

By including or configuring the communications manager 520 in accordance with examples as described herein, the device 505 may support techniques for efficiently sharing a UE-initiated COT with a BS 105. To indicate the UE-initiated COT, a UE 115 may transmit receiver-side assistance information on an uplink shared channel to the BS 105. The receiver-side assistance information may improve communications quality with the BS 105. In some examples, In some examples, the communications manager 520 may be configured to perform various operations (such as receiving, monitoring, transmitting) using or otherwise in cooperation with the transceiver 515, the one or more antennas 525, or any combination thereof. Although the communications manager 520 is illustrated as a separate component, in some examples, one or more functions described with reference to the communications manager 520 may be supported by or performed by the processor 540, the memory 530, the code 535, or any combination thereof. For example, the code 535 may include instructions executable by the processor 540 to cause the device 505 to perform various aspects of receiver-side assistance information using multiple uplink transmit opportunities as described herein, or the processor 540 and the memory 530 may be otherwise configured to perform or support such operations.

Figure 6:
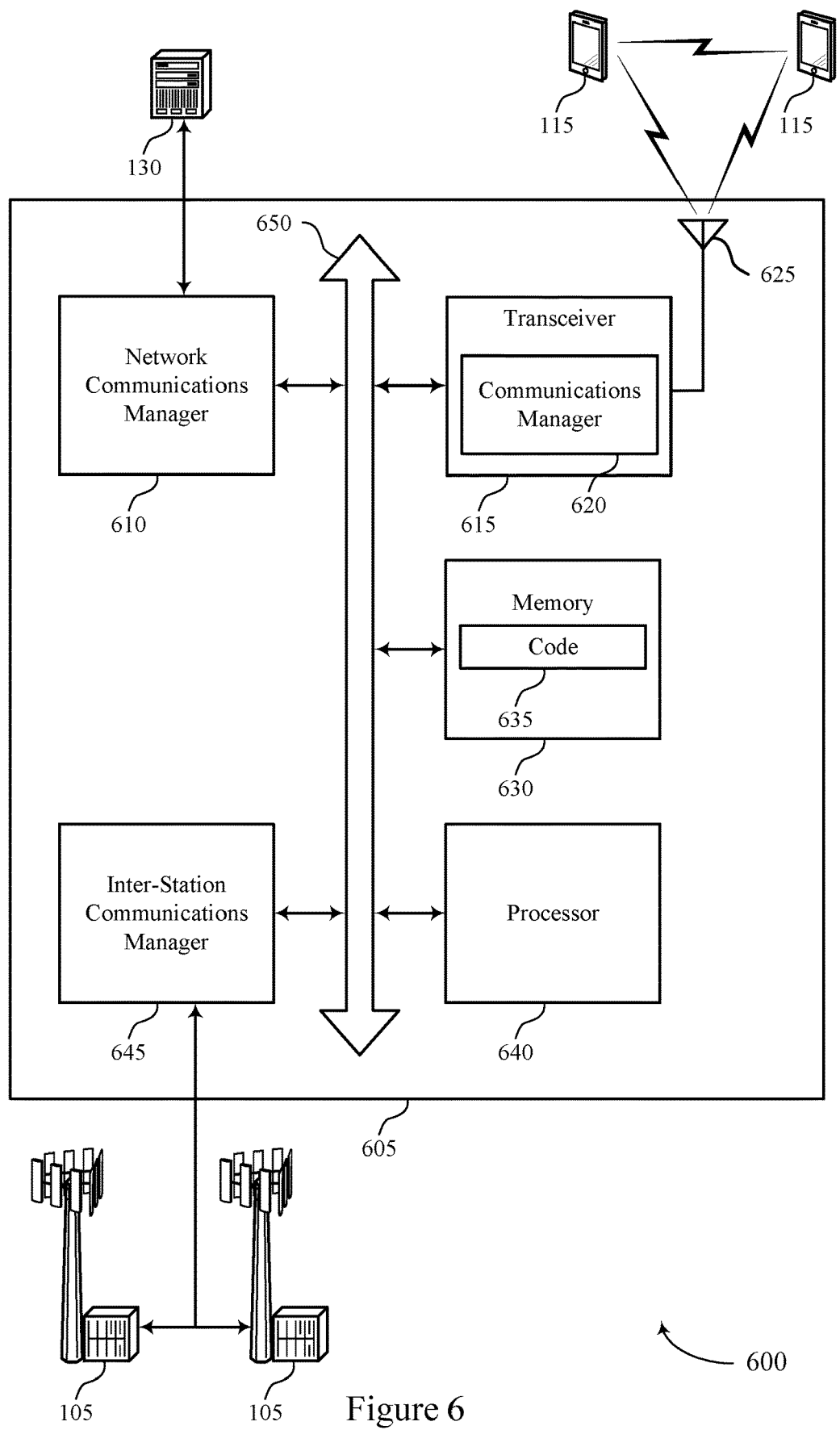

FIG. 6 shows a block diagram 600 including a device 605 that supports receiver-side assistance information using multiple uplink transmit opportunities. The device 605 may be an example of or include the components of a BS 105 as described herein. The device 605 may communicate wirelessly with one or more BSs 105, UEs 115, or any combination thereof. The device 605 may include components for bi-directional voice and data communications including components for transmitting and receiving communications, such as a communications manager 620, a network communications manager 610, a transceiver 615, an antenna 625, a memory 630, code 635, a processor 640, and an inter-station communications manager 645. These components may be in electronic communication or otherwise coupled (such as operatively, communicatively, functionally, electronically, electrically) via one or more buses (such as a bus 650).

The communications manager 620 may support wireless communications at a BS in accordance with examples as disclosed herein. The communications manager 620 may be configured as or otherwise support a means for transmitting an indication of a set of multiple uplink transmit opportunities. The communications manager 620 may be configured as or otherwise support a means for receiving, from a UE, receiver-side assistance information on an uplink shared channel in shared spectrum during a first uplink transmit opportunity of the set of multiple uplink transmit opportunities, the receiver-side assistance information indicating that a COT is initiated. The communications manager 620 may be configured as or otherwise support a means for transmitting a downlink shared channel transmission in the shared spectrum during the COT based on the receiver-side assistance information.

In some examples, to support receiving the receiver-side assistance information, the communications manager 620 may be configured as or otherwise support a means for receiving the receiver-side assistance information on the uplink shared channel at each remaining uplink transmit opportunity of the set of multiple uplink transmit opportunities, where the transmitting the downlink shared channel transmission occurs after the set of multiple uplink transmit opportunities.

In some examples, to support receiving the receiver-side assistance information, the communications manager 620 may be configured as or otherwise support a means for receiving an SRS including the receiver-side assistance information on the uplink shared channel.

In some examples, the communications manager 620 may be configured as or otherwise support a means for transmitting an indication of an energy detection threshold adjustment for CCA measurements by the UE via DCI, RRC signaling, system information signaling, or any combination thereof.

In some examples, the communications manager 620 may be configured as or otherwise support a means for determining an energy detection threshold for CCA measurements by the UE based on the downlink shared channel transmission being a downlink HARQ retransmission.

In some examples, the communications manager 620 may be configured as or otherwise support a means for transmitting an indication of the energy detection threshold via DCI, RRC signaling, system information signaling, or any combination thereof.

In some examples, the receiver-side assistance information includes a CSI report, an RSRP measurement, an SINR measurement, a requested downlink rank indication, a requested beam indication, a requested COT duration indication, an uplink buffer status report, a requested downlink portion of the COT, or any combination thereof.

In some examples, the communications manager 620 may be configured as or otherwise support a means for processing the receiver-side assistance information during a processing delay duration, where a first portion of the downlink shared channel transmission is transmitted based on a default configuration, and a second portion of the downlink shared channel transmission after the processing delay duration is transmitted based on processing the receiver-side assistance information.

In some examples, to support transmitting the indication of the set of multiple uplink transmit opportunities, the communications manager 620 may be configured as or otherwise support a means for transmitting a configured grant indicating a set of multiple configured grant occasions, where the set of multiple uplink transmit opportunities are the set of multiple configured grant occasions.

In some examples, the communications manager 620 may be configured as or otherwise support a means for transmitting DCI activating the configured grant, where the first the receiver-side assistance information is received based on transmitting the DCI.

In some examples, the communications manager 620 may be configured as or otherwise support a means for receiving, in response to transmitting the DCI, a MAC CE including acknowledgment feedback for the DCI.

In some examples, to support transmitting the DCI activating the configured grant, the communications manager 620 may be configured as or otherwise support a means for transmitting a set of multiple repetitions of the DCI activating the configured grant, where the MAC CE indicates acknowledgment feedback for the set of multiple repetitions of the DCI.

In some examples, the communications manager 620 may be configured as or otherwise support a means for transmitting DCI including an SFI indicating a slot format during a second uplink transmit opportunity, where the set of multiple uplink transmit opportunities are associated with a lower priority than the DCI including the SFI. In some examples, the communications manager 620 may be configured as or otherwise support a means for communicating according to the SFI during the second uplink transmit opportunity occasion based on the lower priority of the set of multiple uplink transmit opportunities.

The network communications manager 610 may manage communications with a core network 130 (such as via one or more wired backhaul links). For example, the network communications manager 610 may manage the transfer of data communications for client devices, such as one or more UEs 115.

In some examples, the device 605 may include a single antenna 625. However, in some other examples the device 605 may have more than one antenna 625, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 also may include a modem to modulate the packets, to provide the modulated packets to one or more antennas 625 for transmission, and to demodulate packets received from the one or more antennas 625.

The memory 630 may include RAM and ROM. The memory 630 may store computer-readable, computer-executable code 635 including instructions that, when executed by the processor 640, cause the device 605 to perform various functions described herein. The code 635 may be stored in a non-transitory computer-readable medium such as system memory or another type of memory. In some examples, the code 635 may not be directly executable by the processor 640 but may cause a computer (such as when compiled and executed) to perform functions described herein. In some examples, the memory 630 may contain, among other things, a BIOS which may control basic hardware or software operation such as the interaction with peripheral components or devices.

In some implementations, the processor 640 may be a component of a processing system. A processing system may generally refer to a system or series of machines or components that receives inputs and processes the inputs to produce a set of outputs (which may be passed to other systems or components of, for example, a BS 105). For example, a processing system of a BS 105 may refer to a system including the various other components or subcomponents of a BS 105.

The processing system of the BS 105 may interface with other components of the BS 105 and may process information received from other components (such as inputs or signals) and output information to other components. For example, a chip or modem of the BS 105 may include a processing system, a first interface to receive or obtain information, and a second interface to output, transmit, or provide information. In some implementations, the first interface may refer to an interface between the processing system of the chip or modem and a receiver, such that the BS 105 may receive information or signal inputs, and the information may be passed to the processing system. In some implementations, the second interface may refer to an interface between the processing system of the chip or modem and a transmitter, such that the BS 105 may transmit information output from the chip or modem. One of skill in the art will readily recognize that the second interface also, or alternatively, may obtain or receive information or signal inputs, and the first interface also, or alternatively, may output, transmit, or provide information.

The inter-station communications manager 645 may manage communications with other BSs 105, and may include a controller or scheduler for controlling communications with UEs 115 in cooperation with other BSs 105. For example, the inter-station communications manager 645 may coordinate scheduling for transmissions to UEs 115 for various interference mitigation techniques such as beamforming or joint transmission. In some examples, the inter-station communications manager 645 may provide an X2 interface within an LTE/LTE-A wireless communications network technology to provide communication between BSs 105.

By including or configuring the communications manager 620 in accordance with examples as described herein, the device 605 may support techniques to receive receiver-side assistance information while receiving an indication of a UE-initiated COT. The receiver-side assistance information may be implemented by the device 605 to provide higher quality communications with a UE 115. Additionally, sharing the UE-initiated COT may ensure that the UE 115 is available for downlink reception. For example, an uplink shared channel transmission including the receiver-side assistance information may operate similar to a pre-grant acknowledgment of other systems, indicating that the UE 115 has successfully performed a CCA and acquired the channel medium.

In some examples, the communications manager 620 may be configured to perform various operations (such as receiving, monitoring, transmitting) using or otherwise in cooperation with the transceiver 615, the one or more antennas 625, or any combination thereof. Although the communications manager 620 is illustrated as a separate component, in some examples, one or more functions described with reference to the communications manager 620 may be supported by or performed by the processor 640, the memory 630, the code 635, or any combination thereof. For example, the code 635 may include instructions executable by the processor 640 to cause the device 605 to perform various aspects of receiver-side assistance information using multiple uplink transmit opportunities as described herein, or the processor 640 and the memory 630 may be otherwise configured to perform or support such operations.

Figure 7:
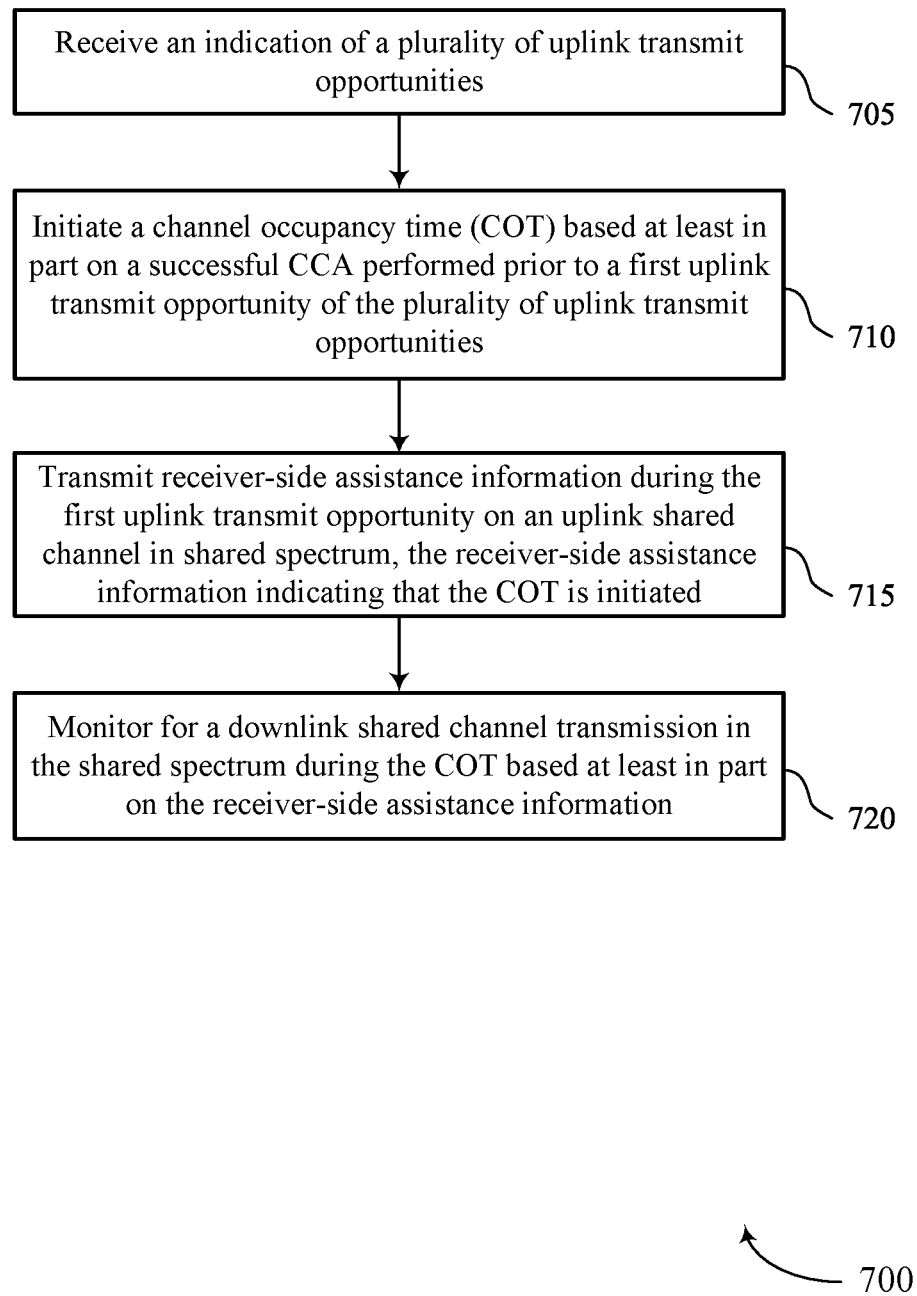
FIGS. 7-9 show flowcharts illustrating methods that support receiver-side assistance information using multiple uplink transmit opportunities.

FIG. 7 shows a flowchart illustrating a method 700 that supports receiver-side assistance information using multiple uplink transmit opportunities. The operations of the method 700 may be implemented by a UE or its components as described herein. For example, the operations of the method 700 may be performed by a UE 115 as described with reference to FIGS. 1-5. In some examples, a UE may execute a set of instructions to control the functional elements of the UE to perform the described functions. Additionally, or alternatively, the UE may perform aspects of the described functions using special-purpose hardware.

At 705, the method may include receiving an indication of a set of multiple uplink transmit opportunities. The operations of 705 may be performed in accordance with examples as disclosed herein. In some examples, aspects of the operations of 705 may be performed by a communications manager 520 as described with reference to FIG. 5.

At 710, the method may include initiating a COT based on a successful CCA performed prior to a first uplink transmit opportunity of the set of multiple uplink transmit opportunities. The operations of 710 may be performed in accordance with examples as disclosed herein. In some examples, aspects of the operations of 710 may be performed by the communications manager 520 as described with reference to FIG. 5.

At 715, the method may include transmitting receiver-side assistance information during the first uplink transmit opportunity on an uplink shared channel in shared spectrum, the receiver-side assistance information indicating that the COT is initiated. The operations of 715 may be performed in accordance with examples as disclosed herein. In some examples, aspects of the operations of 715 may be performed by the communications manager 520 as described with reference to FIG. 5.

At 720, the method may include monitoring for a downlink shared channel transmission in the shared spectrum during the COT based on the receiver-side assistance information. The operations of 720 may be performed in accordance with examples as disclosed herein. In some examples, aspects of the operations of 720 may be performed by the communications manager 520 as described with reference to FIG. 5.

Figure 8:
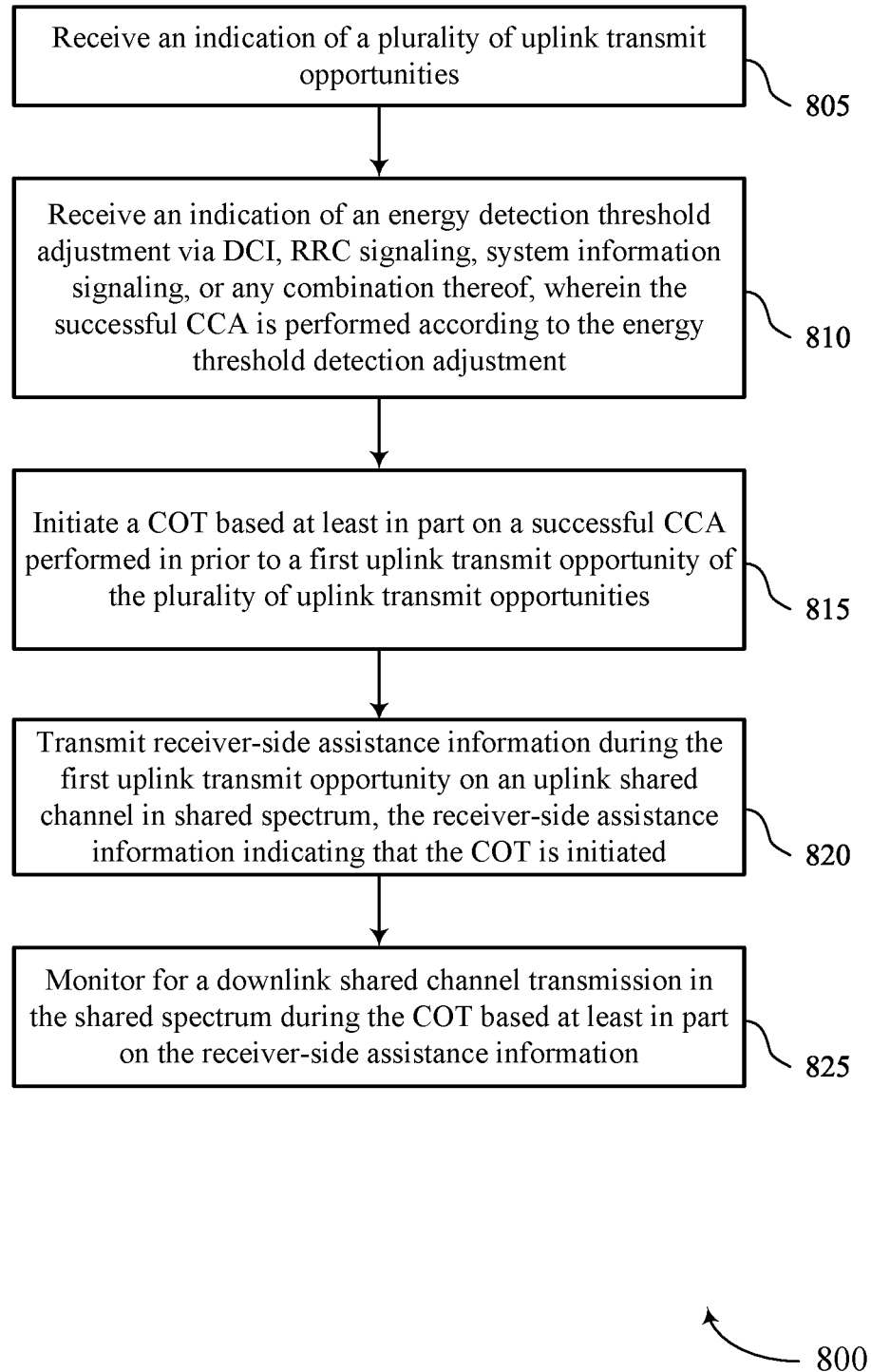

FIG. 8 shows a flowchart illustrating a method 800 that supports receiver-side assistance information using multiple uplink transmit opportunities. The operations of the method 800 may be implemented by a UE or its components as described herein. For example, the operations of the method 800 may be performed by a UE 115 as described with reference to FIGS. 1-5. In some examples, a UE may execute a set of instructions to control the functional elements of the UE to perform the described functions. Additionally, or alternatively, the UE may perform aspects of the described functions using special-purpose hardware.

At 805, the method may include receiving an indication of a set of multiple uplink transmit opportunities. The operations of 805 may be performed in accordance with examples as disclosed herein. In some examples, aspects of the operations of 805 may be performed by a communications manager 520 as described with reference to FIG. 5.

At 810, the method may include receiving an indication of an energy detection threshold adjustment via DCI, RRC signaling, system information signaling, or any combination thereof, where the successful CCA is performed according to the energy threshold detection adjustment. The operations of 810 may be performed in accordance with examples as disclosed herein. In some examples, aspects of the operations of 810 may be performed by the communications manager 520 as described with reference to FIG. 5.

At 815, the method may include initiating a COT based on a successful CCA performed prior to a first uplink transmit opportunity of the set of multiple uplink transmit opportunities. The operations of 815 may be performed in accordance with examples as disclosed herein. In some examples, aspects of the operations of 815 may be performed by the communications manager 520 as described with reference to FIG. 5.

At 820, the method may include transmitting receiver-side assistance information during the first uplink transmit opportunity on an uplink shared channel in shared spectrum, the receiver-side assistance information indicating that the COT is initiated. The operations of 820 may be performed in accordance with examples as disclosed herein. In some examples, aspects of the operations of 820 may be performed by the communications manager 520 as described with reference to FIG. 5.

At 825, the method may include monitoring for a downlink shared channel transmission in the shared spectrum during the COT based on the receiver-side assistance information. The operations of 825 may be performed in accordance with examples as disclosed herein. In some examples, aspects of the operations of 825 may be performed by the communications manager 520 as described with reference to FIG. 5.

Figure 9:
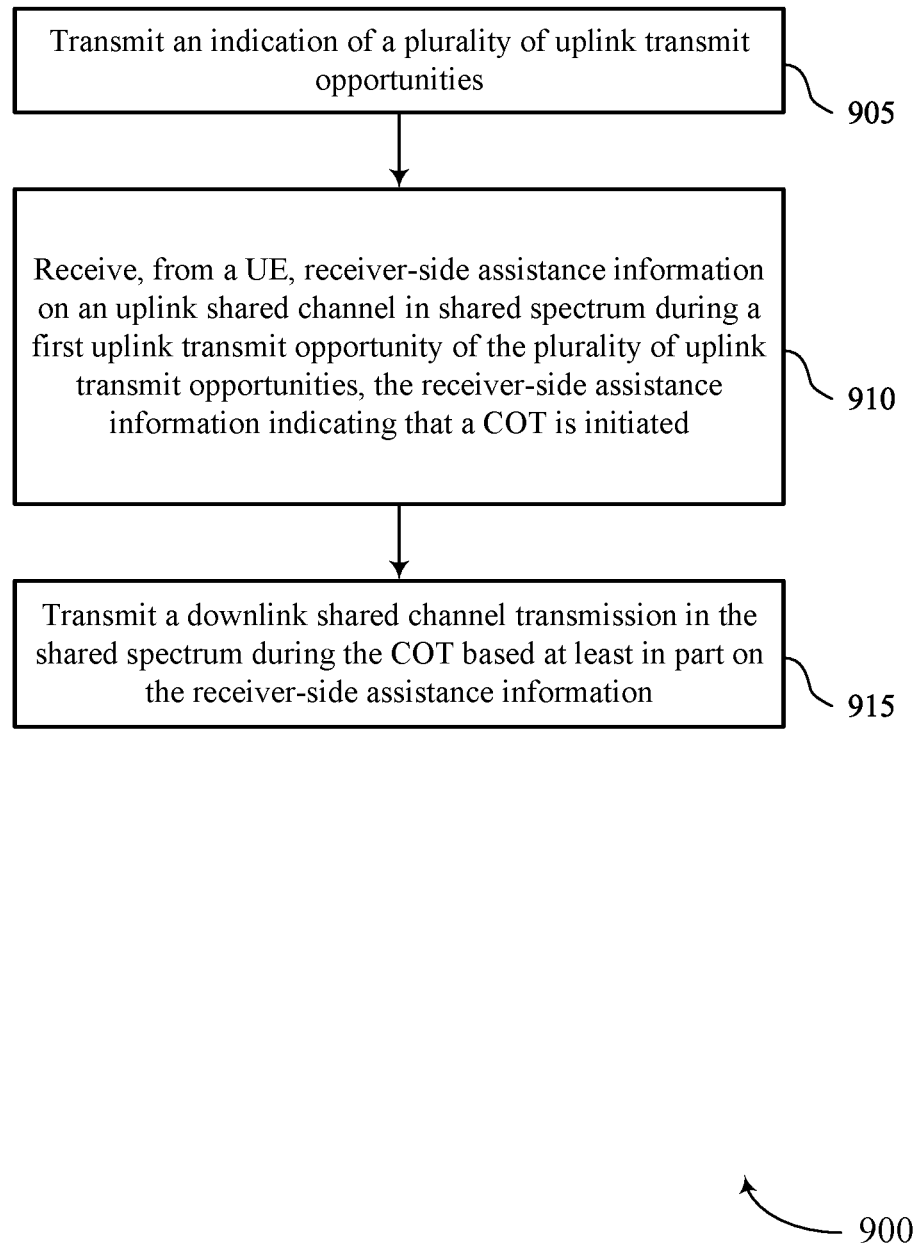

FIG. 9 shows a flowchart illustrating a method 900 that supports receiver-side assistance information using multiple uplink transmit opportunities. The operations of the method 900 may be implemented by a BS or its components as described herein. For example, the operations of the method 900 may be performed by a BS 105 as described with reference to FIGS. 1-4 and FIG. 6. In some examples, a BS may execute a set of instructions to control the functional elements of the BS to perform the described functions. Additionally, or alternatively, the BS may perform aspects of the described functions using special-purpose hardware.

At 905, the method may include transmitting an indication of a set of multiple uplink transmit opportunities. The operations of 905 may be performed in accordance with examples as disclosed herein. In some examples, aspects of the operations of 905 may be performed by a communications manager 620 as described with reference to FIG. 6.

At 910, the method may include receiving, from a UE, receiver-side assistance information on an uplink shared channel in shared spectrum during a first uplink transmit opportunity of the set of multiple uplink transmit opportunities, the receiver-side assistance information indicating that a COT is initiated. The operations of 910 may be performed in accordance with examples as disclosed herein. In some examples, aspects of the operations of 910 may be performed by the communications manager 620 as described with reference to FIG. 6.

At 915, the method may include transmitting a downlink shared channel transmission in the shared spectrum during the COT based on the receiver-side assistance information. The operations of 915 may be performed in accordance with examples as disclosed herein. In some examples, aspects of the operations of 915 may be performed by the communications manager 620 as described with reference to FIG. 6.

The following provides an overview of aspects of the present disclosure:

Aspect 1: A method for wireless communications at a UE, including: receiving an indication of a set of multiple uplink transmit opportunities; initiating a COT based on a successful CCA performed prior to a first uplink transmit opportunity of the set of multiple uplink transmit opportunities; transmitting receiver-side assistance information during the first uplink transmit opportunity on an uplink shared channel in shared spectrum, the receiver-side assistance information indicating that the COT is initiated; and monitoring for a downlink shared channel transmission in the shared spectrum during the COT based on the receiver-side assistance information.

Aspect 2: The method of aspect 1, where transmitting the receiver-side assistance information includes: transmitting the receiver-side assistance information on the uplink shared channel at each remaining uplink transmit opportunity of the set of multiple uplink transmit opportunities, where the monitoring for the downlink shared channel transmission occurs after the set of multiple uplink transmit opportunities.

Aspect 3: The method of any of aspects 1 through 2, further including: cancelling remaining uplink transmit opportunities of the set of multiple uplink transmit opportunities based on outputting the receiver-side assistance information on the uplink shared channel.

Aspect 4: The method of aspect 3, where monitoring for the downlink shared channel transmission includes: monitoring for the downlink shared channel transmission at least partially during the canceled remaining uplink transmit opportunities.

Aspect 5: The method of any of aspects 1 through 4, where transmitting the receiver-side assistance information includes: transmitting an SRS including the receiver-side assistance information on the uplink shared channel.

Aspect 6: The method of any of aspects 1 through 5, further including: receiving an indication of an energy detection threshold adjustment via DCI, RRC signaling, system information signaling, or any combination thereof, where the successful CCA is performed according to the energy threshold detection adjustment.

Aspect 7: The method of any of aspects 1 through 6, further including: determining an energy detection threshold based on the downlink shared channel transmission being a downlink HARQ retransmission, where the successful CCA is performed according to the energy detection threshold.

Aspect 8: The method of aspect 7, further including: receiving an indication of the energy detection threshold via DCI, RRC signaling, system information signaling, or any combination thereof.

Aspect 9: The method of any of aspects 1 through 8, where the receiver-side assistance information includes a CSI report, an RSRP measurement, an SINR measurement, a requested downlink rank indication, a requested beam indication, a requested COT duration indication, an uplink buffer status report, a requested downlink portion of the COT, or any combination thereof.

Aspect 10: The method of any of aspects 1 through 9, where monitoring for the downlink shared channel transmission includes: receiving a first portion of the downlink shared channel transmission based on a default configuration; and receiving, after a delay from the COT based on a processing delay at a BS, a second portion of the downlink shared channel transmission including information based on the receiver-side assistance information.

Aspect 11: The method of any of aspects 1 through 10, where receiving the indication of the set of multiple uplink transmit opportunities includes: receiving a downlink control information scheduling the set of multiple uplink transmit opportunities.

Aspect 12: The method of any of aspects 6 through 11, where receiving the indication of the set of multiple uplink transmit opportunities includes: receiving a configured grant indicating a set of multiple configured grant occasions, where the set of multiple uplink transmit opportunities are the set of multiple configured grant occasions.

Aspect 13: The method of aspect 12, further including: receiving DCI activating the configured grant, where the successful CCA is performed based on receiving the DCI.

Aspect 14: The method of aspect 13, further including: transmitting, in response to receiving the DCI, a MAC CE including acknowledgment feedback for the DCI.

Aspect 15: The method of aspect 14, where receiving the DCI activating the configured grant includes: detecting a set of multiple repetitions of the DCI activating the configured grant, where the MAC CE indicates acknowledgment feedback for the set of multiple repetitions of the DCI.

Aspect 16: The method of any of aspects 1 through 15, further including: receiving DCI including an SFI indicating a slot format during a second uplink transmit opportunity, where the set of multiple uplink transmit opportunities are associated with a lower priority than the DCI including the SFI; and communicating according to the SFI during the second uplink transmit opportunity based on the lower priority of the set of multiple uplink transmit opportunities.

Aspect 17: The method of any of aspects 1 through 16, where the successful CCA follows one or more unsuccessful CCAs associated with corresponding uplink transmit opportunities preceding the first uplink transmit opportunity.

Aspect 18: A method for wireless communications at a BS, including: transmitting an indication of a set of multiple uplink transmit opportunities; receiving, from a UE, receiver-side assistance information on an uplink shared channel in shared spectrum during a first uplink transmit opportunity of the set of multiple uplink transmit opportunities, the receiver-side assistance information indicating that a COT is initiated; and transmitting a downlink shared channel transmission in the shared spectrum during the COT based on the receiver-side assistance information.

Aspect 19: The method of aspect 18, where receiving the receiver-side assistance information includes: receiving the receiver-side assistance information on the uplink shared channel at each remaining uplink transmit opportunity of the set of multiple uplink transmit opportunities, where the transmitting the downlink shared channel transmission occurs after the set of multiple uplink transmit opportunities.

Aspect 20: The method of any of aspects 18 through 19, where receiving the receiver-side assistance information includes: receiving an SRS including the receiver-side assistance information on the uplink shared channel.

Aspect 21: The method of any of aspects 18 through 20, further including: transmitting an indication of an energy detection threshold adjustment for CCA measurements by the UE via DCI, RRC signaling, system information signaling, or any combination thereof.

Aspect 22: The method of any of aspects 18 through 21, further including: determining an energy detection threshold for CCA measurements by the UE based on the downlink shared channel transmission being a downlink HARQ retransmission.

Aspect 23: The method of aspect 22, further including: transmitting an indication of the energy detection threshold via DCI, RRC signaling, system information signaling, or any combination thereof.

Aspect 24: The method of any of aspects 18 through 23, where the receiver-side assistance information includes a CSI report, an RSRP measurement, an SINR measurement, a requested downlink rank indication, a requested beam indication, a requested COT duration indication, an uplink buffer status report, a requested downlink portion of the COT, or any combination thereof.

Aspect 25: The method of any of aspects 18 through 24, further including: processing the receiver-side assistance information during a processing delay duration, where a first portion of the downlink shared channel transmission is transmitted based on a default configuration, and a second portion of the downlink shared channel transmission after the processing delay duration is transmitted based on processing the receiver-side assistance information.

Aspect 26: The method of any of aspects 23 through 25, where transmitting the indication of the set of multiple uplink transmit opportunities includes: transmitting a configured grant indicating a set of multiple configured grant occasions, where the set of multiple uplink transmit opportunities are the set of multiple configured grant occasions.

Aspect 27: The method of aspect 26, further including: transmitting DCI activating the configured grant, where the first the receiver-side assistance information is received based on transmitting the DCI.

Aspect 28: The method of aspect 27, further including: receiving, in response to transmitting the DCI, a MAC CE including acknowledgment feedback for the DCI.

Aspect 29: The method of aspect 28, where transmitting the DCI activating the configured grant includes: transmitting a set of multiple repetitions of the DCI activating the configured grant, where the MAC CE indicates acknowledgment feedback for the set of multiple repetitions of the DCI.

Aspect 30: The method of any of aspects 18 through 29, further including: transmitting DCI including an SFI indicating a slot format during a second uplink transmit opportunity, where the set of multiple uplink transmit opportunities are associated with a lower priority than the DCI including the SFI; and communicating according to the SFI during the second uplink transmit opportunity occasion based on the lower priority of the set of multiple uplink transmit opportunities.

Aspect 31: An apparatus for wireless communications at a UE, including a first interface, a second interface, and processing system configured to cause the apparatus to: obtain an indication of a set of multiple uplink transmit opportunities; initiate a COT based on a successful CCA performed prior to a first uplink transmit opportunity of the set of multiple uplink transmit opportunities; output receiver-side assistance information during the first uplink transmit opportunity on an uplink shared channel in shared spectrum, the receiver-side assistance information indicating that the COT is initiated; and monitor for a downlink shared channel transmission in the shared spectrum during the COT based on the receiver-side assistance information.

Aspect 32: The apparatus of aspect 31, where the second interface is further configured to: output the receiver-side assistance information on the uplink shared channel at each remaining uplink transmit opportunity of the set of multiple uplink transmit opportunities, where the monitoring for the downlink shared channel transmission occurs after the set of multiple uplink transmit opportunities.

Aspect 33: The apparatus of any of aspects 31 through 32, where the processing system is further configured to: cancel remaining uplink transmit opportunities of the set of multiple uplink transmit opportunities based on outputting the receiver-side assistance information on the uplink shared channel.

Aspect 34: The apparatus of aspect 33, the processing system is further configured to: monitor for the downlink shared channel transmission at least partially during the canceled remaining uplink transmit opportunities.

Aspect 35: The apparatus of any of aspects 31 through 34, where the second interface is further configured to: output an SRS including the receiver-side assistance information on the uplink shared channel.

Aspect 36: The apparatus of any of aspects 31 through 35, the first interface is further configured to: obtain an indication of an energy detection threshold adjustment via DCI, RRC signaling, system information signaling, or any combination thereof, where the successful CCA is performed according to the energy threshold detection adjustment.

Aspect 37: The apparatus of any of aspects 31 through 36, where the processing system is further configured to: determine an energy detection threshold based on the downlink shared channel transmission being a downlink HARQ retransmission, where the successful CCA is performed according to the energy detection threshold.

Aspect 38: The apparatus of aspect 37, where the first interface is further configured to: obtain an indication of the energy detection threshold via DCI, RRC signaling, system information signaling, or any combination thereof.

Aspect 39: The apparatus of any of aspects 31 through 38, where the receiver-side assistance information includes a CSI report, an RSRP measurement, an SINR measurement, a requested downlink rank indication, a requested beam indication, a requested COT duration indication, an uplink buffer status report, a requested downlink portion of the COT, or any combination thereof.

Aspect 40: The apparatus of any of aspects 31 through 39, the first interface is further configured to: obtain a first portion of the downlink shared channel transmission based on a default configuration; and obtain, after a delay from the COT based on a processing delay at a BS, a second portion of the downlink shared channel transmission including information based on the receiver-side assistance information.

Aspect 41: The apparatus of any of aspects 31 through 40, where the first interface is further configured to: obtain a downlink control information scheduling the set of multiple uplink transmit opportunities.

Aspect 42: The apparatus of any of aspects 36 through 41, where the first interface is further configured to: obtain a configured grant indicating a set of multiple configured grant occasions, where the set of multiple uplink transmit opportunities are the set of multiple configured grant occasions.

Aspect 43: The apparatus of aspect 42, where the first interface is further configured to: obtain DCI activating the configured grant, where the successful CCA is performed based on obtaining the DCI.

Aspect 44: The apparatus of aspect 43, where the first interface is further configured to: obtain, in response to obtaining the DCI, a MAC CE including acknowledgment feedback for the DCI.

Aspect 45: The apparatus of aspect 44, where the processing system is further configured to: detect a set of multiple repetitions of the DCI activating the configured grant, where the MAC CE indicates acknowledgment feedback for the set of multiple repetitions of the DCI.

Aspect 46: The apparatus of any of aspects 31 through 45, where the first interface is further configured to: obtain DCI including an SFI indicating a slot format during a second uplink transmit opportunity, where the set of multiple uplink transmit opportunities are associated with a lower priority than the DCI including the SFI; and the first interface or the second interface is further configured to: communicate according to the SFI during the second uplink transmit opportunity based on the lower priority of the set of multiple uplink transmit opportunities.

Aspect 47: The apparatus of any of aspects 31 through 46, where the successful CCA follows one or more unsuccessful CCAs associated with corresponding uplink transmit opportunities preceding the first uplink transmit opportunity.

Aspect 48: An apparatus for wireless communications at a BS, including: a first interface configured to: output an indication of a set of multiple uplink transmit opportunities; the first interface or a second interface configured to: obtain, from a UE, receiver-side assistance information on an uplink shared channel in shared spectrum during a first uplink transmit opportunity of the set of multiple uplink transmit opportunities, the receiver-side assistance information indicating that a COT is initiated; and the first interface configured to: output a downlink shared channel transmission in the shared spectrum during the COT based on the receiver-side assistance information.

Aspect 49: The apparatus of aspect 48, where the second interface is further configured to: obtain the receiver-side assistance information on the uplink shared channel at each remaining uplink transmit opportunity of the set of multiple uplink transmit opportunities, where the transmitting the downlink shared channel transmission occurs after the set of multiple uplink transmit opportunities.

Aspect 50: The apparatus of any of aspects 48 through 49, where the second interface is further configured to: obtain an SRS including the receiver-side assistance information on the uplink shared channel.

Aspect 51: The apparatus of any of aspects 48 through 50, where the first interface is further configured to: output an indication of an energy detection threshold adjustment for CCA measurements by the UE via DCI, RRC signaling, system information signaling, or any combination thereof.

Aspect 52: The apparatus of any of aspects 48 through 51, where a processing system is configured to: determine an energy detection threshold for CCA measurements by the UE based on the downlink shared channel transmission being a downlink HARQ retransmission.

Aspect 53: The apparatus of aspect 52, where the first interface is further configured to: output an indication of the energy detection threshold via DCI, RRC signaling, system information signaling, or any combination thereof.

Aspect 54: The apparatus of any of aspects 48 through 53, where the receiver-side assistance information includes a CSI report, an RSRP measurement, an SINR measurement, a requested downlink rank indication, a requested beam indication, a requested COT duration indication, an uplink buffer status report, a requested downlink portion of the COT, or any combination thereof.

Aspect 55: The apparatus of any of aspects 48 through 54, where a processing system is configured to: process the receiver-side assistance information during a processing delay duration, where a first portion of the downlink shared channel transmission is outputted based on a default configuration, and a second portion of the downlink shared channel transmission after the processing delay duration is outputted based on processing the receiver-side assistance information.

Aspect 56: The apparatus of any of aspects 48 through 55, where the first interface is further configured to: output a configured grant indicating a set of multiple configured grant occasions, where the set of multiple uplink transmit opportunities are the set of multiple configured grant occasions.

Aspect 57: The apparatus of aspect 56, where the first interface is further configured to: output DCI activating the configured grant, where the first the receiver-side assistance information is obtained based on outputting the DCI.

Aspect 58: The apparatus of aspect 57, where the second interface is further configured to: obtain, in response to outputting the DCI, a MAC CE including acknowledgment feedback for the DCI.

Aspect 59: The apparatus of aspect 58, where the first interface is further configured to: output a set of multiple repetitions of the DCI activating the configured grant, where the MAC CE indicates acknowledgment feedback for the set of multiple repetitions of the DCI.

Aspect 60: The apparatus of any of aspects 48 through 59, where the first interface is further configured to: output DCI including an SFI indicating a slot format during a second uplink transmit opportunity, where the set of multiple uplink transmit opportunities are associated with a lower priority than the DCI including the SFI; and the first interface or the second interface is further configured to: communicate according to the SFI during the second uplink transmit opportunity occasion based on the lower priority of the set of multiple uplink transmit opportunities.

Aspect 61: An apparatus for wireless communications at a UE, including: means for receiving an indication of a set of multiple uplink transmit opportunities; means for initiating a COT based on a successful CCA performed prior to a first uplink transmit opportunity of the set of multiple uplink transmit opportunities; means for transmitting receiver-side assistance information during the first uplink transmit opportunity on an uplink shared channel in shared spectrum, the receiver-side assistance information indicating that the COT is initiated; and means for monitoring for a downlink shared channel transmission in the shared spectrum during the COT based on the receiver-side assistance information.

Aspect 62: The apparatus of aspect 61, where the means for transmitting the receiver-side assistance information include: means for transmitting the receiver-side assistance information on the uplink shared channel at each remaining uplink transmit opportunity of the set of multiple uplink transmit opportunities, where the monitoring for the downlink shared channel transmission occurs after the set of multiple uplink transmit opportunities.

Aspect 63: The apparatus of any of aspects 61 through 62, further including: means for cancelling remaining uplink transmit opportunities of the set of multiple uplink transmit opportunities based on outputting the receiver-side assistance information on the uplink shared channel.

Aspect 64: The apparatus of aspect 63, where the means for monitoring for the downlink shared channel transmission include: means for monitoring for the downlink shared channel transmission at least partially during the canceled remaining uplink transmit opportunities.

Aspect 65: The apparatus of any of aspects 61 through 64, where the means for transmitting the receiver-side assistance information include: means for transmitting an SRS including the receiver-side assistance information on the uplink shared channel.

Aspect 66: The apparatus of any of aspects 61 through 65, further including: means for receiving an indication of an energy detection threshold adjustment via DCI, RRC signaling, system information signaling, or any combination thereof, where the successful CCA is performed according to the energy threshold detection adjustment.

Aspect 67: The apparatus of any of aspects 61 through 66, further including: means for determining an energy detection threshold based on the downlink shared channel transmission being a downlink HARQ retransmission, where the successful CCA is performed according to the energy detection threshold.

Aspect 68: The apparatus of aspect 67, further including: means for receiving an indication of the energy detection threshold via DCI, RRC signaling, system information signaling, or any combination thereof.

Aspect 69: The apparatus of any of aspects 61 through 68, where the receiver-side assistance information includes a CSI report, an RSRP measurement, an SINR measurement, a requested downlink rank indication, a requested beam indication, a requested COT duration indication, an uplink buffer status report, a requested downlink portion of the COT, or any combination thereof.

Aspect 70: The apparatus of any of aspects 61 through 69, where the means for monitoring for the downlink shared channel transmission include: means for receiving a first portion of the downlink shared channel transmission based on a default configuration; and means for receiving, after a delay from the COT based on a processing delay at a BS, a second portion of the downlink shared channel transmission including information based on the receiver-side assistance information.

Aspect 71: The apparatus of any of aspects 61 through 70, where the means for receiving the indication of the set of multiple uplink transmit opportunities include: means for receiving a downlink control information scheduling the set of multiple uplink transmit opportunities.

Aspect 72: The apparatus of any of aspects 66 through 71, where the means for receiving the indication of the set of multiple uplink transmit opportunities include: means for receiving a configured grant indicating a set of multiple configured grant occasions, where the set of multiple uplink transmit opportunities are the set of multiple configured grant occasions.

Aspect 73: The apparatus of aspect 72, further including: means for receiving DCI activating the configured grant, where the successful CCA is performed based on receiving the DCI.

Aspect 74: The apparatus of aspect 73, further including: means for transmitting, in response to receiving the DCI, a MAC CE including acknowledgment feedback for the DCI.

Aspect 75: The apparatus of aspect 74, where the means for receiving the DCI activating the configured grant include: means for detecting a set of multiple repetitions of the DCI activating the configured grant, where the MAC CE indicates acknowledgment feedback for the set of multiple repetitions of the DCI.

Aspect 76: The apparatus of any of aspects 61 through 75, further including: means for receiving DCI including an SFI indicating a slot format during a second uplink transmit opportunity, where the set of multiple uplink transmit opportunities are associated with a lower priority than the DCI including the SFI; and means for communicating according to the SFI during the second uplink transmit opportunity based on the lower priority of the set of multiple uplink transmit opportunities.

Aspect 77: The apparatus of any of aspects 61 through 76, where the successful CCA follows one or more unsuccessful CCAs associated with corresponding uplink transmit opportunities preceding the first uplink transmit opportunity.

Aspect 78: An apparatus for wireless communications at a BS, including: means for transmitting an indication of a set of multiple uplink transmit opportunities; means for receiving, from a UE, receiver-side assistance information on an uplink shared channel in shared spectrum during a first uplink transmit opportunity of the set of multiple uplink transmit opportunities, the receiver-side assistance information indicating that a COT is initiated; and means for transmitting a downlink shared channel transmission in the shared spectrum during the COT based on the receiver-side assistance information.

Aspect 79: The apparatus of aspect 78, where the means for receiving the receiver-side assistance information include: means for receiving the receiver-side assistance information on the uplink shared channel at each remaining uplink transmit opportunity of the set of multiple uplink transmit opportunities, where the transmitting the downlink shared channel transmission occurs after the set of multiple uplink transmit opportunities.

Aspect 80: The apparatus of any of aspects 78 through 79, where the means for receiving the receiver-side assistance information include: means for receiving an SRS including the receiver-side assistance information on the uplink shared channel.

Aspect 81: The apparatus of any of aspects 78 through 80, further including: means for transmitting an indication of an energy detection threshold adjustment for CCA measurements by the UE via DCI, RRC signaling, system information signaling, or any combination thereof.

Aspect 82: The apparatus of any of aspects 78 through 81, further including: means for determining an energy detection threshold for CCA measurements by the UE based on the downlink shared channel transmission being a downlink HARQ retransmission.

Aspect 83: The apparatus of aspect 82, further including: means for transmitting an indication of the energy detection threshold via DCI, RRC signaling, system information signaling, or any combination thereof.

Aspect 84: The apparatus of any of aspects 78 through 83, where the receiver-side assistance information includes a CSI report, an RSRP measurement, an SINR measurement, a requested downlink rank indication, a requested beam indication, a requested COT duration indication, an uplink buffer status report, a requested downlink portion of the COT, or any combination thereof.

Aspect 85: The apparatus of any of aspects 78 through 84, further including: means for processing the receiver-side assistance information during a processing delay duration, where a first portion of the downlink shared channel transmission is transmitted based on a default configuration, and a second portion of the downlink shared channel transmission after the processing delay duration is transmitted based on processing the receiver-side assistance information.

Aspect 86: The apparatus of any of aspects 78 through 85, where the means for transmitting the indication of the set of multiple uplink transmit opportunities include: means for transmitting a configured grant indicating a set of multiple configured grant occasions, where the set of multiple uplink transmit opportunities are the set of multiple configured grant occasions.

Aspect 87: The apparatus of aspect 86, further including: means for transmitting DCI activating the configured grant, where the first the receiver-side assistance information is received based on transmitting the DCI.

Aspect 88: The apparatus of aspect 87, further including: means for receiving, in response to transmitting the DCI, a MAC CE including acknowledgment feedback for the DCI.

Aspect 89: The apparatus of aspect 88, where the means for transmitting the DCI activating the configured grant include: means for transmitting a set of multiple repetitions of the DCI activating the configured grant, where the MAC CE indicates acknowledgment feedback for the set of multiple repetitions of the DCI.

Aspect 90: The apparatus of any of aspects 78 through 89, further including: means for transmitting DCI including an SFI indicating a slot format during a second uplink transmit opportunity, where the set of multiple uplink transmit opportunities are associated with a lower priority than the DCI including the SFI; and means for communicating according to the SFI during the second uplink transmit opportunity occasion based on the lower priority of the set of multiple uplink transmit opportunities.

Aspect 91: A non-transitory computer-readable medium storing code for wireless communications at a UE, the code including instructions executable by a processor to: receive an indication of a set of multiple uplink transmit opportunities; initiate a COT based on a successful CCA performed prior to a first uplink transmit opportunity of the set of multiple uplink transmit opportunities; transmit receiver-side assistance information during the first uplink transmit opportunity on an uplink shared channel in shared spectrum, the receiver-side assistance information indicating that the COT is initiated; and monitor for a downlink shared channel transmission in the shared spectrum during the COT based on the receiver-side assistance information.

Aspect 92: The non-transitory computer-readable medium of aspect 91, where the instructions to transmit the receiver-side assistance information are executable by the processor to: transmit the receiver-side assistance information on the uplink shared channel at each remaining uplink transmit opportunity of the set of multiple uplink transmit opportunities, where the monitoring for the downlink shared channel transmission occurs after the set of multiple uplink transmit opportunities.

Aspect 93: The non-transitory computer-readable medium of any of aspects 91 through 92, where the instructions are further executable by the processor to: cancel remaining uplink transmit opportunities of the set of multiple uplink transmit opportunities based on outputting the receiver-side assistance information on the uplink shared channel.

Aspect 94: The non-transitory computer-readable medium of aspect 93, where the instructions to monitor for the downlink shared channel transmission are executable by the processor to: monitor for the downlink shared channel transmission at least partially during the canceled remaining uplink transmit opportunities.

Aspect 95: The non-transitory computer-readable medium of any of aspects 91 through 94, where the instructions to transmit the receiver-side assistance information are executable by the processor to: transmit an SRS including the receiver-side assistance information on the uplink shared channel.

Aspect 96: The non-transitory computer-readable medium of any of aspects 91 through 95, where the instructions are further executable by the processor to: receive an indication of an energy detection threshold adjustment via DCI, RRC signaling, system information signaling, or any combination thereof, where the successful CCA is performed according to the energy threshold detection adjustment.

Aspect 97: The non-transitory computer-readable medium of any of aspects 91 through 96, where the instructions are further executable by the processor to: determine an energy detection threshold based on the downlink shared channel transmission being a downlink HARQ retransmission, where the successful CCA is performed according to the energy detection threshold.

Aspect 98: The non-transitory computer-readable medium of aspect 97, where the instructions are further executable by the processor to: receive an indication of the energy detection threshold via DCI, RRC signaling, system information signaling, or any combination thereof.

Aspect 99: The non-transitory computer-readable medium of any of aspects 91 through 98, where the receiver-side assistance information includes a CSI report, an RSRP measurement, an SINR measurement, a requested downlink rank indication, a requested beam indication, a requested COT duration indication, an uplink buffer status report, a requested downlink portion of the COT, or any combination thereof.

Aspect 100: The non-transitory computer-readable medium of any of aspects 91 through 99, where the instructions to monitor for the downlink shared channel transmission are executable by the processor to: receive a first portion of the downlink shared channel transmission based on a default configuration; and receive, after a delay from the COT based on a processing delay at a BS, a second portion of the downlink shared channel transmission including information based on the receiver-side assistance information.

Aspect 101: The non-transitory computer-readable medium of any of aspects 91 through 100, where the instructions to receive the indication of the set of multiple uplink transmit opportunities are executable by the processor to: receive a downlink control information scheduling the set of multiple uplink transmit opportunities.

Aspect 102: The non-transitory computer-readable medium of any of aspects 96 through 101, where the instructions to receive the indication of the set of multiple uplink transmit opportunities are executable by the processor to: receive a configured grant indicating a set of multiple configured grant occasions, where the set of multiple uplink transmit opportunities are the set of multiple configured grant occasions.

Aspect 103: The non-transitory computer-readable medium of aspect 102, where the instructions are further executable by the processor to: receive DCI activating the configured grant, where the successful CCA is performed based on receiving the DCI.

Aspect 104: The non-transitory computer-readable medium of aspect 103, where the instructions are further executable by the processor to: transmit, in response to receiving the DCI, a MAC CE including acknowledgment feedback for the DCI.

Aspect 105: The non-transitory computer-readable medium of aspect 104, where the instructions to receive the DCI activating the configured grant are executable by the processor to: detect a set of multiple repetitions of the DCI activating the configured grant, where the MAC CE indicates acknowledgment feedback for the set of multiple repetitions of the DCI.

Aspect 106: The non-transitory computer-readable medium of any of aspects 91 through 105, where the instructions are further executable by the processor to: receive DCI including an SFI indicating a slot format during a second uplink transmit opportunity, where the set of multiple uplink transmit opportunities are associated with a lower priority than the DCI including the SFI; and communicate according to the SFI during the second uplink transmit opportunity based on the lower priority of the set of multiple uplink transmit opportunities.

Aspect 107: The non-transitory computer-readable medium of any of aspects 91 through 106, where the successful CCA follows one or more unsuccessful CCAs associated with corresponding uplink transmit opportunities preceding the first uplink transmit opportunity.

Aspect 108: A non-transitory computer-readable medium storing code for wireless communications at a BS, the code including instructions executable by a processor to: transmit an indication of a set of multiple uplink transmit opportunities; receive, from a UE, receiver-side assistance information on an uplink shared channel in shared spectrum during a first uplink transmit opportunity of the set of multiple uplink transmit opportunities, the receiver-side assistance information indicating that a COT is initiated; and transmit a downlink shared channel transmission in the shared spectrum during the COT based on the receiver-side assistance information.

Aspect 109: The non-transitory computer-readable medium of aspect 108, where the instructions to receive the receiver-side assistance information are executable by the processor to: receive the receiver-side assistance information on the uplink shared channel at each remaining uplink transmit opportunity of the set of multiple uplink transmit opportunities, where the transmitting the downlink shared channel transmission occurs after the set of multiple uplink transmit opportunities.

Aspect 110: The non-transitory computer-readable medium of any of aspects 108 through 109, where the instructions to receive the receiver-side assistance information are executable by the processor to: receive an SRS including the receiver-side assistance information on the uplink shared channel.

Aspect 111: The non-transitory computer-readable medium of any of aspects 108 through 110, where the instructions are further executable by the processor to: transmit an indication of an energy detection threshold adjustment for CCA measurements by the UE via DCI, RRC signaling, system information signaling, or any combination thereof.

Aspect 112: The non-transitory computer-readable medium of any of aspects 108 through 111, where the instructions are further executable by the processor to: determine an energy detection threshold for CCA measurements by the UE based on the downlink shared channel transmission being a downlink HARQ retransmission.

Aspect 113: The non-transitory computer-readable medium of aspect 112, where the instructions are further executable by the processor to: transmit an indication of the energy detection threshold via DCI, RRC signaling, system information signaling, or any combination thereof.

Aspect 114: The non-transitory computer-readable medium of any of aspects 108 through 113, where the receiver-side assistance information includes a CSI report, an RSRP measurement, an SINR measurement, a requested downlink rank indication, a requested beam indication, a requested COT duration indication, an uplink buffer status report, a requested downlink portion of the COT, or any combination thereof.

Aspect 115: The non-transitory computer-readable medium of any of aspects 108 through 114, where the instructions are further executable by the processor to: process the receiver-side assistance information during a processing delay duration, where a first portion of the downlink shared channel transmission is transmitted based on a default configuration, and a second portion of the downlink shared channel transmission after the processing delay duration is transmitted based on processing the receiver-side assistance information.

Aspect 116: The non-transitory computer-readable medium of any of aspects 108 through 115, where the instructions to transmit the indication of the set of multiple uplink transmit opportunities are executable by the processor to: transmit a configured grant indicating a set of multiple configured grant occasions, where the set of multiple uplink transmit opportunities are the set of multiple configured grant occasions.

Aspect 117: The non-transitory computer-readable medium of aspect 116, where the instructions are further executable by the processor to: transmit DCI activating the configured grant, where the first the receiver-side assistance information is received based on transmitting the DCI.

Aspect 118: The non-transitory computer-readable medium of aspect 117, where the instructions are further executable by the processor to: receive, in response to transmitting the DCI, a MAC CE including acknowledgment feedback for the DCI.

Aspect 119: The non-transitory computer-readable medium of aspect 118, where the instructions to transmit the DCI activating the configured grant are executable by the processor to: transmit a set of multiple repetitions of the DCI activating the configured grant, where the MAC CE indicates acknowledgment feedback for the set of multiple repetitions of the DCI.

Aspect 120: The non-transitory computer-readable medium of any of aspects 108 through 119, where the instructions are further executable by the processor to: transmit DCI including an SFI indicating a slot format during a second uplink transmit opportunity, where the set of multiple uplink transmit opportunities are associated with a lower priority than the DCI including the SFI; and communicate according to the SFI during the second uplink transmit opportunity occasion based on the lower priority of the set of multiple uplink transmit opportunities.

Aspect 121: The apparatus of any of aspects 48 through 60, where the first interface is further configured to: obtain DCI from a BS; and the processing system is further configured to: perform at least one CCA procedure for at least one of the multiple sets of uplink transmit opportunities based on the DCI.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some examples be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some examples, the actions recited in the claims can be performed in a different order and still achieve desirable results.

What is claimed is:

1. An apparatus for wireless communications at a user equipment (UE), comprising:
a first interface configured to:
obtain an indication of a plurality of uplink transmit opportunities;
a processing system configured to:
initiate a channel occupancy time (COT) based at least in part on a successful clear channel assessment (CCA) performed prior to a first uplink transmit opportunity of the plurality of uplink transmit opportunities;
the first interface or a second interface configured to:
output receiver-side assistance information during the first uplink transmit opportunity on an uplink shared channel in shared spectrum and at each remaining uplink transmit opportunity of the plurality of uplink transmit opportunities, the receiver-side assistance information indicating that the COT is initiated; and
the processing system further configured to:
monitor for a downlink shared channel transmission in the shared spectrum during the COT based at least in part on the receiver-side assistance information.

2. The apparatus of claim 1, wherein the monitoring for the downlink shared channel transmission occurs after the plurality of uplink transmit opportunities.

3. The apparatus of claim 1, wherein the second interface is further configured to:
output a sounding reference signal (SRS) including the receiver-side assistance information on the uplink shared channel.

4. The apparatus of claim 1, wherein the first interface is further configured to:
obtain an indication of an energy detection threshold adjustment via downlink control information (DCI), radio resource control (RRC) signaling, system information signaling, or any combination thereof, wherein the successful CCA is performed according to the energy threshold detection adjustment.

5. The apparatus of claim 1, wherein the processing system is further configured to:
determine an energy detection threshold based at least in part on the downlink shared channel transmission being a downlink hybrid automatic repeat request (HARQ) retransmission, wherein the successful CCA is performed according to the energy detection threshold.

6. The apparatus of claim 5, wherein the first interface is further configured to:
obtain an indication of the energy detection threshold via downlink control information (DCI), radio resource control (RRC) signaling, system information signaling, or any combination thereof.

7. The apparatus of claim 1, wherein the receiver-side assistance information includes a channel state information (CSI) report, a reference signal received power (RSRP) measurement, a signal to interference plus noise ratio (SINR) measurement, a requested downlink rank indication, a requested beam indication, a requested COT duration indication, an uplink buffer status report, a requested downlink portion of the COT, or any combination thereof.

8. The apparatus of claim 1, wherein the first interface is further configured to:
obtain a first portion of the downlink shared channel transmission based at least in part on a default configuration; and
obtain, after a delay from the COT based at least in part on a processing delay at a base station (BS), a second portion of the downlink shared channel transmission including information based at least in part on the receiver-side assistance information.

9. The apparatus of claim 1, wherein the first interface is further configured to:
obtain a downlink control information scheduling the plurality of uplink transmit opportunities.

10. The apparatus of claim 1, wherein the first interface is further configured to:
obtain a configured grant indicating a plurality of configured grant occasions, wherein the plurality of uplink transmit opportunities are the plurality of configured grant occasions.

11. The apparatus of claim 10, wherein the first interface is further configured to:

obtain downlink control information (DCI) activating the configured grant, wherein the successful CCA is performed based at least in part on obtaining the DCI.

12. The apparatus of claim 11, wherein the second interface is further configured to:
output, in response to obtaining the DCI, a medium access control (MAC) control element (CE) including acknowledgment feedback for the DCI.

13. The apparatus of claim 12, wherein the processing system is further configured to:
detect a plurality of repetitions of the DCI activating the configured grant, wherein the MAC CE indicates the acknowledgment feedback for the plurality of repetitions of the DCI.

14. The apparatus of claim 1, wherein
the first interface is further configured to:
obtain downlink control information (DCI) including a slot format indicator (SFI) indicating a slot format during a second uplink transmit opportunity, wherein the plurality of uplink transmit opportunities are associated with a lower priority than the DCI including the SFI; and
the first interface or the second interface is further configured to:
communicate according to the SFI during the second uplink transmit opportunity based at least in part on the lower priority of the plurality of uplink transmit opportunities.

15. The apparatus of claim 1, wherein the successful CCA follows one or more unsuccessful CCAs associated with corresponding uplink transmit opportunities preceding the first uplink transmit opportunity.

16. The apparatus of claim 1, wherein
the first interface is further configured to:
obtain downlink control information (DCI) from a base station (BS); and
the processing system is further configured to:
perform at least one CCA procedure for at least one of the plurality of uplink transmit opportunities based at least in part on the DCI.

17. An apparatus for wireless communications at a user equipment (UE), comprising:
a first interface configured to:
obtain an indication of a plurality of uplink transmit opportunities;
a processing system configured to:
initiate a channel occupancy time (COT) based at least in part on a successful clear channel assessment (CCA) performed prior to a first uplink transmit opportunity of the plurality of uplink transmit opportunities;
the first interface or a second interface configured to:
output receiver-side assistance information during the first uplink transmit opportunity on an uplink shared channel in shared spectrum, the receiver-side assistance information indicating that the COT is initiated;
the processing system further configured to:
monitor for a downlink shared channel transmission in the shared spectrum during the COT based at least in part on the receiver-side assistance information; and
cancel remaining uplink transmit opportunities of the plurality of uplink transmit opportunities based at least in part on outputting the receiver-side assistance information on the uplink shared channel.

18. The apparatus of claim 17, wherein the processing system is further configured to:
monitor for the downlink shared channel transmission at least partially during the canceled remaining uplink transmit opportunities.

19. An apparatus for wireless communications at a base station (BS), comprising:
a first interface configured to:
output an indication of a plurality of uplink transmit opportunities;
the first interface or a second interface configured to:
obtain, from a user equipment (UE), receiver-side assistance information on an uplink shared channel in shared spectrum during a first uplink transmit opportunity and at each remaining uplink transmit opportunity of the plurality of uplink transmit opportunities, the receiver-side assistance information indicating that a channel occupancy time (COT) is initiated; and
the first interface configured to:
output a downlink shared channel transmission in the shared spectrum during the COT based at least in part on the receiver-side assistance information.

20. The apparatus of claim 19, wherein the outputting the downlink shared channel transmission occurs after the plurality of uplink transmit opportunities.

21. The apparatus of claim 19, wherein the second interface is further configured to:
obtain a sounding reference signal (SRS) including the receiver-side assistance information on the uplink shared channel.

22. The apparatus of claim 19, wherein the first interface is further configured to:
output an indication of an energy detection threshold adjustment for clear channel assessment (CCA) measurements by the UE via downlink control information (DCI), radio resource control (RRC) signaling, system information signaling, or any combination thereof.

23. The apparatus of claim 19, wherein a processing system is configured to:
determine an energy detection threshold for clear channel assessment (CCA) measurements by the UE based at least in part on the downlink shared channel transmission being a downlink hybrid automatic repeat request (HARQ) retransmission.

24. The apparatus of claim 23, wherein the first interface is further configured to:
output an indication of the energy detection threshold via downlink control information (DCI), radio resource control (RRC) signaling, system information signaling, or any combination thereof.

25. The apparatus of claim 19, wherein the receiver-side assistance information includes a channel state information (CSI) report, a reference signal received power (RSRP) measurement, a signal to interference plus noise ratio (SINR) measurement, a requested downlink rank indication, a requested beam indication, a requested COT duration indication, an uplink buffer status report, a requested downlink portion of the COT, or any combination thereof.

26. The apparatus of claim 19, wherein a processing system is configured to:
process the receiver-side assistance information during a processing delay duration, wherein a first portion of the downlink shared channel transmission is outputted based at least in part on a default configuration, and a second portion of the downlink shared channel transmission after the processing delay duration is outputted based at least in part on processing the receiver-side assistance information.

27. The apparatus of claim 19, wherein the first interface is further configured to:
output a configured grant indicating a plurality of configured grant occasions, wherein the plurality of uplink transmit opportunities are the plurality of configured grant occasions.

28. The apparatus of claim 27, wherein the first interface is further configured to:
output downlink control information (DCI) activating the configured grant, wherein the first the receiver-side assistance information is obtained based at least in part on outputting the DCI.

29. The apparatus of claim 28, wherein the second interface is further configured to:
obtain, in response to outputting the DCI, a medium access control (MAC) control element (CE) including acknowledgment feedback for the DCI.

30. The apparatus of claim 29, wherein the first interface is further configured to:
output a plurality of repetitions of the DCI activating the configured grant, wherein the MAC CE indicates the acknowledgment feedback for the plurality of repetitions of the DCI.

31. The apparatus of claim 19, wherein
the first interface is further configured to:
output downlink control information (DCI) including a slot format indicator (SFI) indicating a slot format during a second uplink transmit opportunity, wherein the plurality of uplink transmit opportunities are associated with a lower priority than the DCI including the SFI; and
the first interface or the second interface is further configured to:
communicate according to the SFI during the second uplink transmit opportunity occasion based at least in part on the lower priority of the plurality of uplink transmit opportunities.

32. A method for wireless communications at a user equipment (UE), comprising:
receiving an indication of a plurality of uplink transmit opportunities;
initiating a channel occupancy time (COT) based at least in part on a successful clear channel assessment (CCA) performed prior to a first uplink transmit opportunity of the plurality of uplink transmit opportunities;
transmitting receiver-side assistance information during the first uplink transmit opportunity and at each remaining uplink transmit opportunity of the plurality of uplink transmit opportunities on an uplink shared channel in shared spectrum, the receiver-side assistance information indicating that the COT is initiated; and
monitoring for a downlink shared channel transmission in the shared spectrum during the COT based at least in part on the receiver-side assistance information.

33. The method of claim 32, wherein the monitoring for the downlink shared channel transmission occurs after the plurality of uplink transmit opportunities.

34. The method of claim 32, further comprising:
cancelling remaining uplink transmit opportunities of the plurality of uplink transmit opportunities based at least in part on transmitting the receiver-side assistance information on the uplink shared channel.

35. The method of claim 32, wherein transmitting the receiver-side assistance information comprises:
transmitting a sounding reference signal (SRS) including the receiver-side assistance information on the uplink shared channel.

36. The method of claim 32, wherein the receiver-side assistance information includes a channel state information (CSI) report, a reference signal received power (RSRP) measurement, a signal to interference plus noise ratio (SINR) measurement, a requested downlink rank indication, a requested beam indication, a requested COT duration indication, an uplink buffer status report, a requested downlink portion of the COT, or any combination thereof.

37. A method for wireless communications at a base station (BS), comprising:
transmitting an indication of a plurality of uplink transmit opportunities;
receiving, from a user equipment (UE), receiver-side assistance information on an uplink shared channel in shared spectrum during a first uplink transmit opportunity and at each remaining uplink transmit opportunity of the plurality of uplink transmit opportunities, the receiver-side assistance information indicating that a channel occupancy time (COT) is initiated; and
transmitting a downlink shared channel transmission in the shared spectrum during the COT based at least in part on the receiver-side assistance information.

38. The method of claim 37, wherein the transmitting the downlink shared channel transmission occurs after the plurality of uplink transmit opportunities.

39. The method of claim 37, wherein receiving the receiver-side assistance information comprises:
receiving a sounding reference signal (SRS) including the receiver-side assistance information on the uplink shared channel.

40. The method of claim 37, wherein the receiver-side assistance information includes a channel state information (CSI) report, a reference signal received power (RSRP) measurement, a signal to interference plus noise ratio (SINR) measurement, a requested downlink rank indication, a requested beam indication, a requested COT duration indication, an uplink buffer status report, a requested downlink portion of the COT, or any combination thereof.

* * * * *